US008120282B2

(12) United States Patent
Yamauchi

(10) Patent No.: US 8,120,282 B2
(45) Date of Patent: Feb. 21, 2012

(54) DISCHARGE LAMP LIGHTING DEVICE, CONTROL METHOD FOR THE SAME, AND PROJECTOR

(75) Inventor: Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 12/405,877

(22) Filed: Mar. 17, 2009

(65) Prior Publication Data
US 2009/0237625 A1 Sep. 24, 2009

(30) Foreign Application Priority Data

Mar. 21, 2008 (JP) ................................ 2008-074216

(51) Int. Cl.
*H05B 37/02* (2006.01)
(52) U.S. Cl. .......................... 315/307; 315/247; 315/360
(58) Field of Classification Search .............. 315/209 R, 315/224–226, 247, 287, 291, 307–308, 360; 353/85
See application file for complete search history.

(56) References Cited

U.S. PATENT DOCUMENTS

| 5,410,221 | A | * | 4/1995 | Mattas et al. | 315/307 |
| 5,486,740 | A | * | 1/1996 | Yamashita et al. | 315/308 |
| 5,498,933 | A | * | 3/1996 | Nakamura | 315/205 |
| 5,608,294 | A | * | 3/1997 | Derra et al. | 315/224 |
| 5,969,484 | A | * | 10/1999 | Santi et al. | 315/247 |
| 6,750,620 | B2 | * | 6/2004 | Suzuki | 315/291 |
| 6,815,907 | B2 | | 11/2004 | Riederer | |
| 6,958,581 | B2 | * | 10/2005 | Okawa et al. | 315/291 |
| 6,963,176 | B2 | * | 11/2005 | Onishi et al. | 315/291 |
| 7,208,882 | B2 | * | 4/2007 | Ishizuka | 315/225 |
| 2009/0237623 | A1 | * | 9/2009 | Yamauchi | 353/85 |

FOREIGN PATENT DOCUMENTS

| JP | 2005-038815 A | 2/2005 |
| JP | 2005-100786 A | 4/2005 |

* cited by examiner

*Primary Examiner* — Tung X Le
(74) *Attorney, Agent, or Firm* — AdvantEdge Law Group, LLC

(57) ABSTRACT

In at least one embodiment of the disclosure a discharge lamp lighting device includes a controller configured to control an AC conversion circuit to perform AC conversion control for controlling the timings at which a polarity of the discharge lamp driving AC current is reversed. The controller is configured to control the power control circuit to perform current control for controlling a current value of the DC current. The controller changes the cumulative energy supplied to each electrode of a discharge lamp in one cycle of the AC current for the discharge lamp driving in accordance with a cyclical pattern. The cyclical pattern includes a plurality of segmented periods during each of which the cumulative energy is maintained at a same level for a plurality of cycles of the AC current for the discharge lamp driving, and a level of the cumulative energy in at least two of the segmented periods differ from each other.

19 Claims, 20 Drawing Sheets

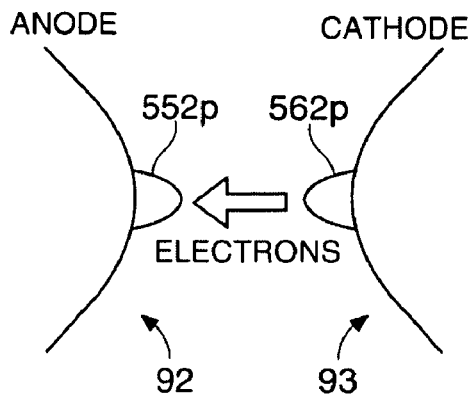
FIG. 4A
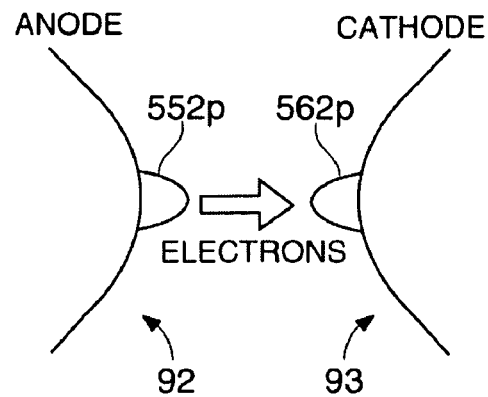
FIG. 4B
FIG. 4C
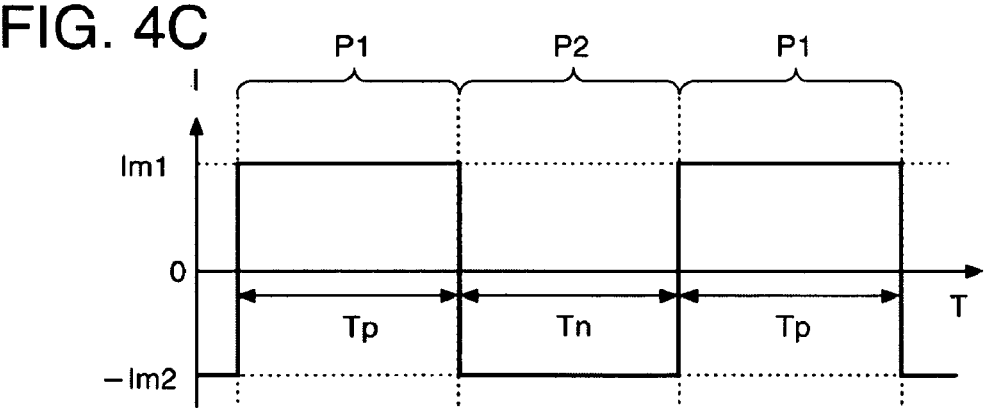
FIG. 4D
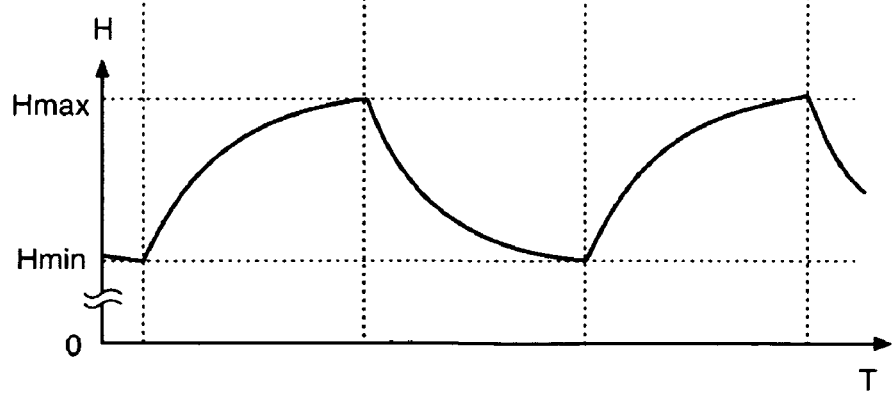

DISCHARGE LAMP LIGHTING DEVICE, CONTROL METHOD FOR THE SAME, AND PROJECTOR

BACKGROUND

1. Technical Field

The present invention relates to a discharge lamp lighting device, a control method for the same, and a projector.

2. Related Art

As a light source of a projector, a discharge lamp such as a high-pressure mercury lamp or metal halide lamp is used. In such a discharge lamp, wear of electrodes due to discharge causes change in the shape of the electrodes. If plural protrusions are grown at the distal end of the electrodes or irregular wear of the electrode bodies progresses, shift of arc starting point and change in arc length occur. These phenomena cause reduction in luminance of the discharge lamp and shorten the life of the discharge lamp. This is not desirable.

As a method to address this problem, U.S. Pat. No. 6,815,907 proposes a technique of pulse width modulation with the absolute value of an AC current for discharge lamp driving maintained substantially at a constant level.

However, in the case where a discharge lamp is used to a projector the like, driving power may be changed by light adjustment or mode switching by the user (for example, switching between a high-luminance mode for high-power driving and a long-life mode for low-power driving). Since the temperature of the electrodes is proportional to power supplied to the discharge lamp, in the case of low-power driving, particular attentions must be paid in order to restrain occurrence of flicker when the electrode temperature is lowered.

SUMMARY

An advantage of some aspects of the invention is that a discharge lamp lighting device, a control method for the same, and a projector can be provided which restrain occurrence of flicker at the time of low-power driving while restraining formation of a stationary convection current within the discharge lamp and thus preventing uneven wear of the electrodes and uneven precipitation of the electrode material.

According to an aspect of the invention, a discharge lamp lighting device includes: a power control circuit that outputs a DC current; an AC converter circuit that takes the DC current as its input, inverts polarity of the DC current in predetermined timing, and thereby generates and outputs an AC current for discharge lamp driving; and a control unit that carries out AC conversion control processing to the AC converter circuit to control polarity inversion timing of the AC current for discharge lamp driving, and current control processing to the power control circuit to control a current value of the DC current. The control unit carries out control to change, in a cyclical pattern, cumulative energy supplied to each electrode of a discharge lamp during one cycle of the AC current for discharge lamp driving. The cyclical pattern includes plural sectional periods in which the cumulative energy is maintained at the same value over plural cycles of the AC current for discharge lamp driving. The cumulative energy differs between at least two of the sectional periods. The control unit receives a power control signal from outside, then carries out current control processing in which an average value of the DC current in a section corresponding to one cycle of the AC current for discharge lamp driving is regarded as a current value corresponding to the power control signal, and controls a length of the sectional period in association with the average value.

According to this aspect, the cumulative energy supplied to each electrode of the discharge lamp during one cycle is changed in a cyclical pattern including plural sectional periods in which the cumulative energy supplied to each electrode of the discharge lamp during one cycle is maintained at the same value over plural cycles of the AC current for discharge lamp driving. Thus, a temperature difference of tens to hundreds of degrees is generated between the two electrodes. Therefore, formation of a stationary convection current within the discharge lamp can be restrained and uneven wear of the electrodes and uneven precipitation of the electrode material can be prevented.

As the length of the sectional period is controlled in association with driving power of the discharge lamp, occurrence of flicker at the time of low-power driving can be restrained.

The cumulative energy is energy equivalent to the electric energy supplied from the discharge lamp lighting device during a period when each electrode is an anode.

According to another aspect of the invention, a discharge lamp lighting device includes: a power control circuit that outputs a DC current; an AC converter circuit that takes the DC current as its input, repeats inverting polarity of the DC current between first polarity and second polarity in predetermined timing, and thereby generates and outputs an AC current for discharge lamp driving; and a control unit that carries out AC conversion control processing to the AC converter circuit to control a duty ratio that is a proportion of time of the first polarity in one cycle of the AC current in accordance with polarity inversion timing of the AC current for discharge lamp driving, and current control processing to the power control circuit to control a current value of the DC current. The control unit carries out the AC current control processing to change the duty ratio of the AC current for discharge lamp driving in a cyclical pattern. The cyclical pattern includes plural sectional periods in which the duty ratio is maintained at the same value over plural cycles of the AC current for discharge lamp driving. The duty ratio differs between at least two of the sectional periods. The control unit receives a power control signal from outside, then carries out current control processing in which an average value of the DC current in a section corresponding to one cycle of the AC current for discharge lamp driving is regarded as a current value corresponding to the power control signal, and carries out the AC conversion control processing to control a length of the sectional period in association with the average value.

According to this aspect, the duty ratio of the AC current for discharge lamp driving is changed in a cyclical pattern including plural sectional periods in which the duty ratio of the AC current for discharge lamp driving is maintained at the same value over plural cycles of the AC current for discharge lamp driving. Thus, a temperature difference of tens to hundreds of degrees is generated between the two electrodes. Therefore, formation of a stationary convection current within the discharge lamp can be restrained and uneven wear of the electrodes and uneven precipitation of the electrode material can be prevented.

As the length of the sectional period is controlled in association with driving power of the discharge lamp, occurrence of flicker at the time of low-power driving can be restrained.

The duty ratio is the proportion of time of the first polarity in one cycle of the AC current for discharge lamp driving that is inverted between the first polarity and the second polarity.

It is preferable that the control unit carries out the AC conversion control processing to reduce the length of the sectional period as the average value is reduced.

It is also preferable that the control unit carries out the AC conversion control processing to control the length of the sectional period in association with a difference between the duty ratio and a predetermined reference duty ratio.

It is also preferable that the control unit carries out the AC conversion control processing to reduce the length of the sectional period as a difference between the duty ratio and a predetermined reference duty ratio is increased.

According to still another aspect of the invention, a discharge lamp lighting device includes: a power control circuit that outputs a DC current; an AC converter circuit that takes the DC current as its input, repeats inverting polarity of the DC current between first polarity and second polarity in predetermined timing, and thereby generates and outputs an AC current for discharge lamp driving; and a control unit that carries out AC conversion control processing to the AC converter circuit to control polarity inversion timing of the AC current for discharge lamp driving, and sectional current control processing to the power control circuit to control a current value of the DC current. The control unit carries the sectional current control processing to change, in a cyclical pattern, a difference in absolute value between a current value in a section where the AC current for discharge lamp driving has the first polarity and a current value in a section where the AC current for discharge lamp driving has the second polarity. The cyclical pattern includes plural sectional periods in which the difference in absolute value is maintained at the same value over plural cycles of the AC current for discharge lamp driving. The difference in absolute value differs between at least two of the sectional periods. The control unit receives a power control signal from outside, then regards an average value of the DC current in a section corresponding to one cycle of the AC current for discharge lamp driving as a current value corresponding to the power control signal, and carries out the sectional current control processing to control a length of the sectional period in association with the average value.

According to this aspect, the difference in absolute value between the current value of the AC current for discharge lamp driving in the first polarity section and the current value in the second polarity section is changed in a cyclical pattern including plural sectional periods in which the difference in absolute value between the current value of the AC current for discharge lamp driving in the first polarity section and the current value in the second polarity section is maintained at the same value over plural cycles of the AC current for discharge lamp driving. Thus, a temperature difference of tens to hundreds of degrees is generated between the two electrodes. Therefore, formation of a stationary convection current within the discharge lamp can be restrained and uneven wear of the electrodes and uneven precipitation of the electrode material can be prevented.

As the length of the sectional period is controlled in association with driving power of the discharge lamp, occurrence of flicker at the time of low-power driving can be restrained.

It is preferable that the control unit carries out the sectional current control processing to reduce the length of the sectional period as the average value is reduced.

It is also preferable that the control unit carries out the sectional current control processing to control the length of the sectional period in association with the difference in absolute value.

It is also preferable that the control unit carries out the sectional current control processing to reduce the length of the sectional period as the difference in absolute value is increased.

It is also preferable that the control unit carries out the AC conversion control processing to control frequency of the AC current for discharge lamp driving in association with the average value.

It is also preferable that the control unit carries out the AC conversion control processing to increase frequency of the AC current for discharge lamp driving as the average value is reduced.

According to still another aspect of the invention, a control method is for a discharge lamp lighting device including a power control circuit that outputs a DC current, and an AC converter circuit that takes the DC current as its input, inverts polarity of the DC current in predetermined timing and thereby generates and outputs an AC current for discharge lamp driving. The method includes carrying out AC conversion control processing to the AC conversion circuit to control polarity inversion timing of the AC current for discharge lamp driving, carrying out current control processing to the power control circuit to control a current value of the DC current, and changing, in a cyclical pattern, cumulative energy supplied to each electrode of the discharge lamp during one cycle of the AC current for discharge lamp driving. The cyclical pattern includes plural sectional periods in which the cumulative energy is maintained at the same value over plural cycles of the AC current for discharge lamp driving. The cumulative energy differs between at least two of the sectional periods. In changing in the cyclical pattern, a power control signal is received from outside, the current control processing is carried out in which an average value of the DC current in a section corresponding to one cycle of the AC current for discharge lamp driving is regarded as a current value corresponding to the power control signal, and a length of the sectional period is controlled in association with the average value.

According to still another aspect of the invention, a projector includes the above discharge lamp lighting device.

BRIEF DESCRIPTION OF THE DRAWINGS

The invention will be described with reference to the accompanying drawings, wherein like numbers reference like elements.

FIG. 4A to FIG. 4D are views for explaining an exemplary circuit configuration of a discharge lamp lighting device according to an embodiment of the invention.

DESCRIPTION OF EXEMPLARY EMBODIMENTS

Hereinafter, a preferred embodiment of the invention will be described in detail with reference to the drawings. The following embodiment should not unduly limit the contents of the invention described in claims. Moreover, all the elements of the configuration described below do not necessarily constitute essential elements of the invention.

1. Optical System of Projector

Figure 1:
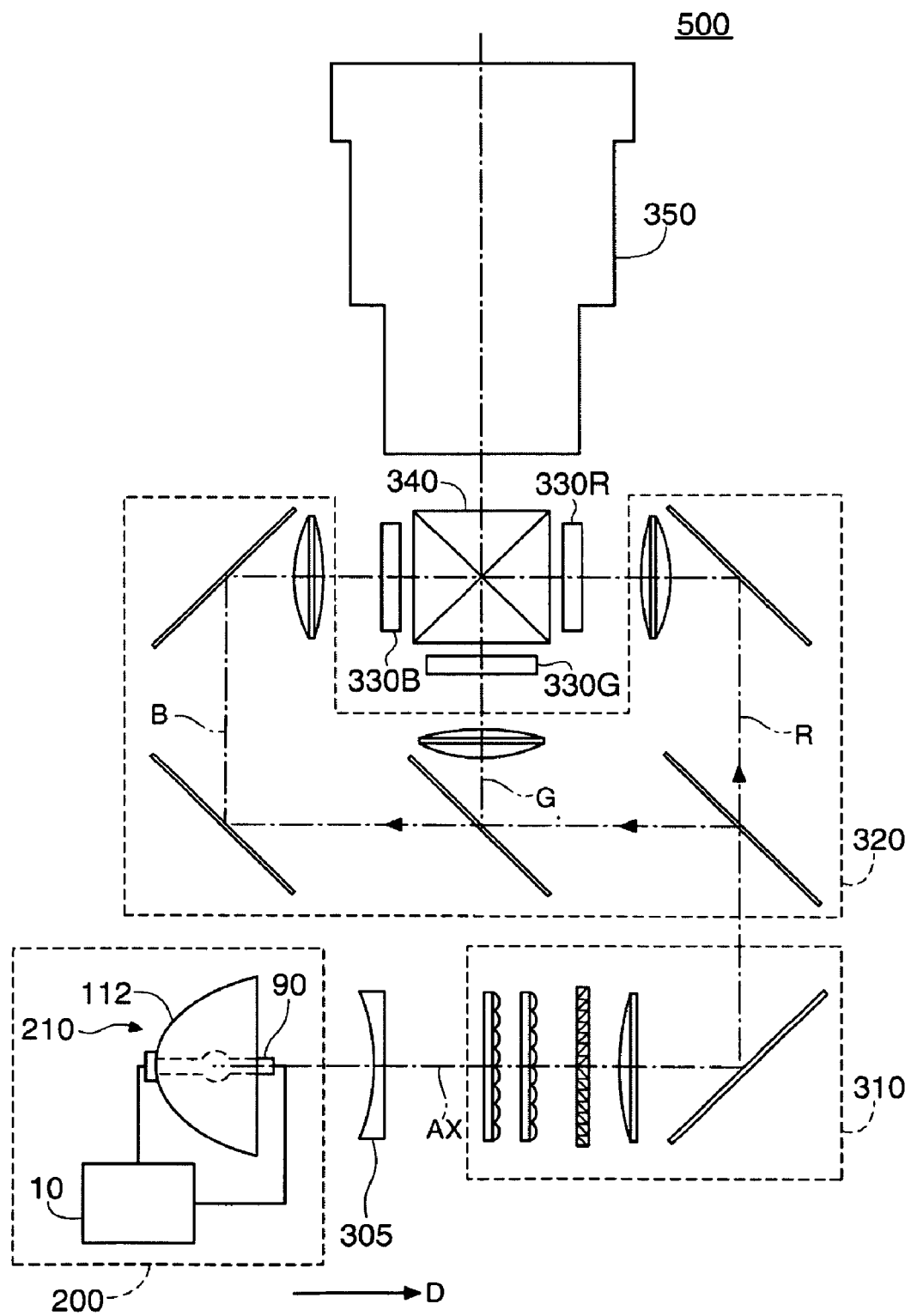
FIG. 1 is a view for explaining an optical system of a projector according to an embodiment of the invention.

FIG. 1 is an explanatory view showing a projector 500 as an exemplary embodiment of the invention. The projector 500 has a light source 200, a parallelizing lens 305, an illumination system 310, a color separation system 320, three liquid crystal light valves 330R, 330G and 330B, a cross dichroic prism 340, and a projection system 350.

The light source 200 has a light source unit 210 and a discharge lamp lighting device 10. The light source unit 210 has a main reflection mirror 112 and a discharge lamp 90. The discharge lamp lighting device 10 supplies power to the discharge lamp 90 and thus lights the discharge lamp 90. The main reflection mirror 112 reflects the light emitted from the discharge lamp 90 toward an irradiation direction D. The irradiation direction D is parallel to an optical axis AX. The light from the light source unit 210 passes through the parallelizing lens 305 and becomes incident on the illumination system 310. This parallelizing lens 305 parallelizes the light from the light source unit 210.

The illumination system 310 equalizes the illuminance of the light from the light source 200 at the liquid crystal light valves 330R, 330G and 330B. The illumination system 310 also aligns the polarization direction of the light from the light source 200 into one direction. The reason for this is to effectively utilize the light from the light source 200 at the liquid crystal light valves 330R, 330G and 330B. The light with its illuminance distribution and polarization direction adjusted becomes incident on the color separation system 320. The color separation system 320 separates the incident light into three color light beams, that is, red (R), green (G) and blue (B). The three color light beams are modulated by the liquid crystal light valves 330R, 330G and 330B corresponding to their respective colors. The liquid crystal light valves 330R, 330G and 330B have liquid crystal panels 560R, 560G and 560B, and polarizers arranged on the light incident side and light exiting side of the liquid crystal panels 560R, 560G and 560B, respectively. The modulated three color light beams are combined by the cross dichroic prism 340. The combined light becomes incident on the projection system 350. The projection system 350 projects the incident light to a screen, not shown. Thus, an image is displayed on the screen.

For the configuration of each of the parallelizing lens 305, the illumination system 310, the color separation system 320, the cross dichroic prism 340, and the projection system 350, various known configuration can be employed.

Figure 2:
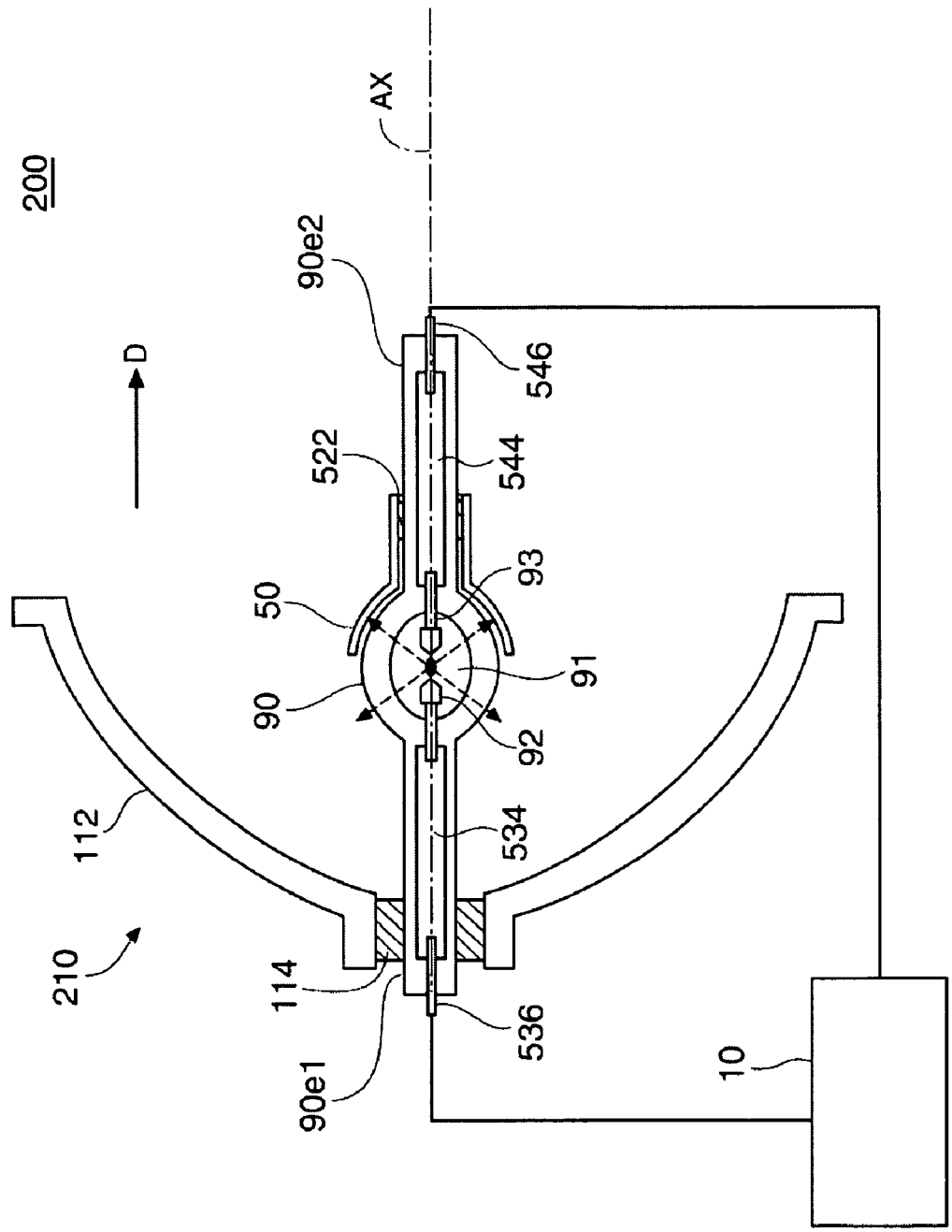
FIG. 2 is a view for explaining an optical system of a projector according to an embodiment of the invention.

FIG. 2 is an explanatory view showing the configuration of the light source 200. The light source 200 has the light source unit 210 and the discharge lamp lighting device 10. FIG. 2 shows a sectional view of the light source unit 210. The light source unit 210 has the main reflection mirror 112, the discharge lamp 90, and a sub reflection mirror 50.

The discharge lamp 90 has a bar-shape extending along the irradiation direction D from a first edge 90e1 to a second edge 90e2. The material of the discharge lamp 90 is a light-transmissive material such as quartz glass. A central part of the discharge lamp 90 is expanded in a spherical shape, in which a discharge space 91 is formed. A gas as a discharge medium containing rare gas, metal halide and so is sealed in the discharge space 91.

In the discharge space 91, two electrodes 92 and 93 are protruding from the discharge lamp 90. The first electrode 92 is arranged on the first edge 90e1 side in the discharge space 91 and the second electrode 93 is arranged on the second edge 90e2 side in the discharge space 91. These electrodes 92 and 93 have a bar-shape extending along the optical axis AX. In the discharge space 91, the distal ends (also referred to as "electrode tips") of the electrodes 92 and 93 face each other at a predetermined distance from each other. The material of the electrodes 92 and 93 is a metal such as tungsten.

A first terminal 536 is provided at the first edge 90e1 of the discharge lamp 90. The first terminal 536 and the first electrode 92 are electrically connected with each other by a conductive member 534 passing through the discharge lamp 90. Similarly, a second terminal 546 is provided at the second edge 90e2 of the discharge lamp 90. The second terminal 546 and the second electrode 93 are electrically connected with each other by a conductive member 544 passing through the discharge lamp 90. The material of the terminals 536 and 546 is a metal such as tungsten. As the conductive members 534 and 544, for example, molybdenum foils are used.

The terminals 536 and 546 are connected to the discharge lamp lighting device 10. The discharge lamp lighting device 10 supplies an AC current to these terminals 536 and 546. As a result, arc discharge occurs between the two electrodes 92 and 93. Light (discharge light) generated by the arc discharge is radiated in all directions from the discharge position, as indicated by dotted arrows.

The main reflection mirror 112 is fixed at the first edge 90e1 of the discharge lamp 90 by a fixing member 114. The reflection surface (the surface on the discharge lamp 90 side) of the main reflection mirror 112 has a spheroidal shape. The main reflection mirror 112 reflects the discharge light toward the irradiation direction D. The shape of the reflection surface of the main reflection mirror 112 is not limited to a spheroidal shape. Various shapes that reflect the discharge light toward the irradiation direction D can be employed. For example, the shape of a paraboloid of revolution may be employed. In such case, the main reflection mirror 112 can convert the discharge light to light substantially parallel to the optical axis AX. Therefore, the parallelizing lens 305 can be omitted.

The sub reflection mirror 50 is fixed to the second edge 90e2 side of the discharge lamp 90 by a fixing member 522. The reflection surface (the surface on the discharge lamp 90 side) of the sub reflection mirror 50 has a spherical shape surrounding the second edge 90e2 side of the discharge space 91. The sub reflection mirror 50 reflects the discharge light toward the main reflection mirror 112. Thus, the efficiency of utilization of the light radiated from the discharge space 91 can be enhanced.

As the material of the fixing members 114 and 522, an arbitrary heat-resistant material that can withstand heat generation of the discharge lamp 90 (for example, an inorganic adhesive) can be employed. The technique of fixing the arrangement of the main reflection mirror 112, the sub reflection mirror 50 and the discharge lamp 90 is not limited to fixing the main reflection mirror 112 and the sub reflection mirror 50 to the discharge lamp 90, and an arbitrary technique can be employed. For example, the discharge lamp 90 and the main reflection mirror 112 may be separately fixed to the casing of the projector (not shown). This also applies to the sub reflection mirror 50.

Figure 3:
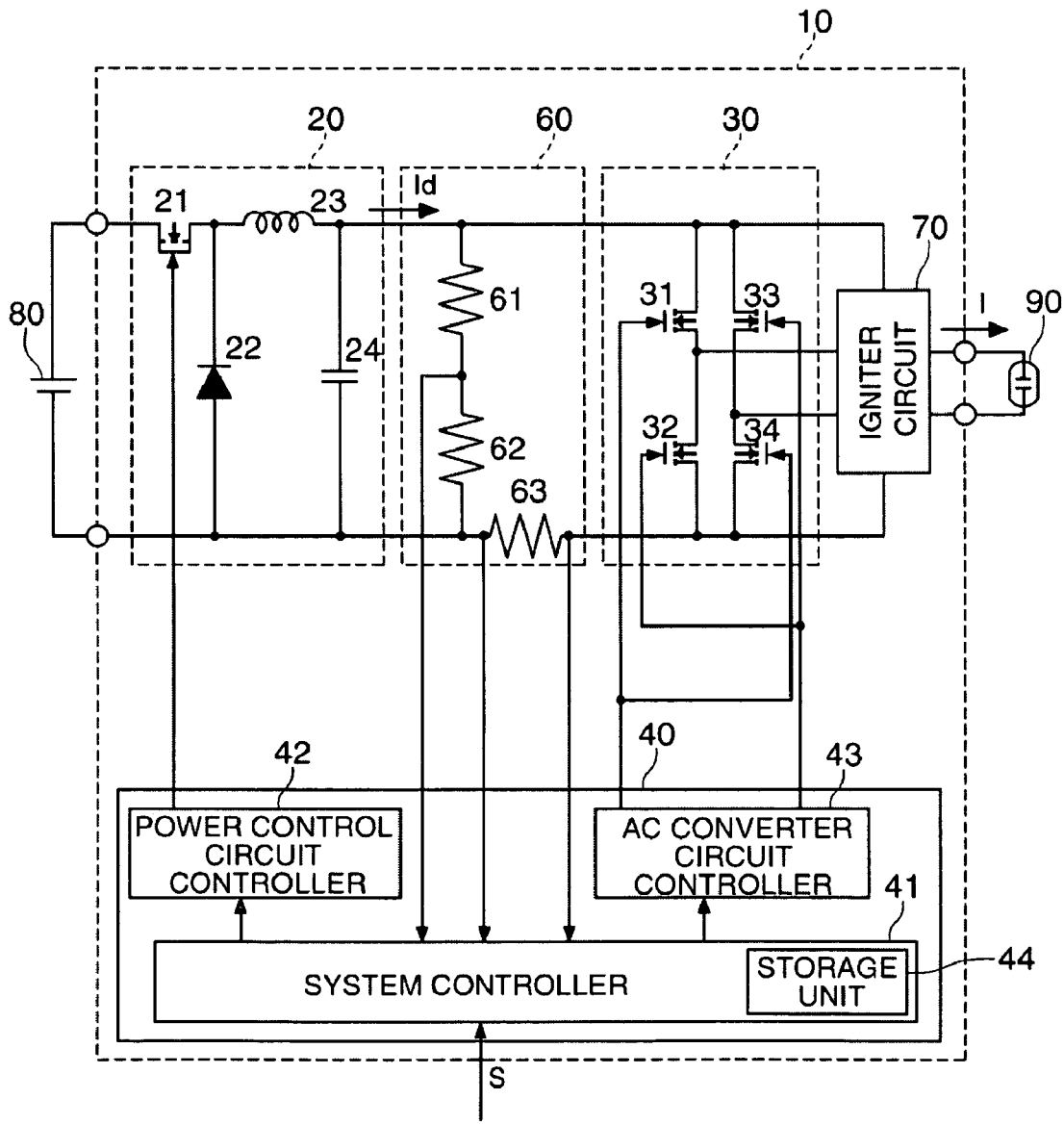
FIG. 3 is a view for explaining an exemplary circuit configuration of a discharge lamp lighting device according to an embodiment of the invention.

2. Discharge Lamp Lighting Device According to First Embodiment (1) Exemplary Circuit Configuration of Discharge Lamp Lighting Device FIG. 3 shows an exemplary circuit diagram of the discharge lamp lighting device according to this embodiment.

The discharge lamp lighting device 10 includes a power control circuit 20. The power control circuit 20 controls driving power supplied to the discharge lamp 90. In this embodiment, the power control circuit 20 is formed by a down chopper circuit that takes a DC power source 80 as its input, then lowers the input voltage and outputs a DC current Id.

The power control circuit 20 may include a switch element 21, a diode 22, a coil 23 and a capacitor 24. The switch element 21 may be formed, for example, by a transistor. In this embodiment, one end of the switch element 21 is connected to the positive voltage side of the DC power source 80 and the other end is connected to the cathode terminal of the diode 22 and one end of the coil 23. Moreover, one end of the capacitor 24 is connected to the other end of the coil 23 and the other end of the capacitor 24 is connected to the anode terminal of the diode 22 and the negative voltage side of the DC power source 80. To the control terminal of the switch element 21, a current control signal is inputted from a control unit 40, thus controlling on/off state of the switch element 21. As the current control signal, for example, a PWM control signal may be used.

Now, when the switch element 21 is turned on, a current flows through the coil 23 and energy is accumulated in the coil 23. After that, when the switch element 21 is turned off, the energy accumulated in the coil 23 is released via the capacitor 24 and the diode 22. As a result, a DC current Id is generated which corresponds to the proportion of time when the switch element 21 is on.

The discharge lamp lighting device 10 includes an AC converter circuit 30. The Ac converter circuit 30 takes, as its input, the DC current Id outputted from the power control circuit 20, then inverts polarity in predetermined timing, and thus generates and outputs a driving current for discharge lamp driving having an arbitrary frequency and duty ratio. The duty ratio is the proportion of time of first polarity in one cycle of an AC current I for discharge lamp driving which is inverted between first polarity and second polarity. In this embodiment, the Ac converter circuit 30 is formed by an inverter bridge circuit (full-bridge circuit).

The AC converter circuit 30 includes, for example, first to fourth switch elements 31 to 34 such as transistors. The first and second switch elements 31 and 32, which are connected in series, and the third and fourth switch elements 33 and 34, which are connected in series, are connected in parallel. A frequency control signal from the control unit 40 is inputted to each of the control terminals of the first to fourth switch elements 31 to 34, thus controlling on/off state of the first to fourth switch elements 31 to 34.

In the AC converter circuit 30, alternate turning on and off of the first and fourth switch elements 31 and 34 and the second and third switch elements 32 and 33 is repeated. Thus, the polarity of the DC current Id outputted from the power control circuit 20 is alternately inverted. An AC current I for discharge lamp driving having a controlled frequency and duty ratio is generated and outputted from the common connection point of the first and second switch elements 31 and 32 and the common connection point of the third and fourth switch elements 33 and 34.

That is, these switch elements are controlled in such a manner that when the first and fourth switch elements 31 and 34 are on, the second and third switch elements 32 and 33 are off, whereas when the first and fourth switch elements 31 and 34 are off, the second and third switch elements 32 and 33 are on. Therefore, when the first and fourth switch elements 31 and 34 are on, an AC current I for discharge lamp driving is generated which flows from the one end of the capacitor 24 to the first switch element 31, the discharge lamp 90 and the fourth switch element 34 in this order. When the second and third switch elements 32 and 33 are on, an AC current I for discharge lamp driving is generated which flows from the one end of the capacitor 24 to the third switch element 33, the discharge lamp 90 and the second switch element 32 in this order.

The discharge lamp lighting device 10 includes the control unit 40. The control unit 40 controls the power control circuit 20 and the AC converter circuit 30, thereby controlling the current value, frequency, duty ratio and waveform of the AC current I for discharge lamp driving. The control unit 40 carries out AC conversion control processing to the AC converter circuit 30 to control the frequency and duty ratio by using the polarity inversion timing of the AC current I for discharge lamp driving, and also carries out sectional current control processing to the power control circuit 20 to control the current value of the outputted DC current Id for each first polarity section or second polarity section. Here, the first polarity section and the second polarity section refer to the time between polarity inversion timings that are next to each other in time. That is, one cycle of the AC current I for discharge lamp driving includes two sections, that is, the first polarity section and the second polarity section.

The control unit 40 also receives a power control signal S from outside and carries out sectional current control processing in which an average value of the DC current Id outputted from the power control circuit 20 is regarded as a current value corresponding to the power control signal S. The power control signal S may be, for example, a signal having continuous values like a signal based on light adjustment by the user, or may be a signal having discrete values like a signal based on mode switching (for example, mode switching between a high-luminance mode for high-power driving and a long-life mode for low-power driving).

The configuration of the control unit 40 is not particularly limited. However, in this embodiment, the control unit 40 includes a system controller 41, a power control circuit controller 42 and an AC converter circuit controller 43. A part of the control unit 40 or its entirety may be formed by a semiconductor integrated circuit.

The system controller 41 controls the power control circuit controller 42 and the AC converter circuit controller 43 and thereby controls the power control circuit 20 and the AC converter circuit 30. The system controller 41 may control the power control circuit controller 42 and the AC converter circuit controller 43 in accordance with a discharge lamp driving voltage and the AC current I for discharge lamp driving detected by an operation detecting unit 60 provided within the discharge lamp lighting device 10, which will be described later.

In this embodiment, the system controller 41 includes a storage unit 44. The storage unit 44 may also be provided separately from the system controller 41.

The system controller 41 may control the power control circuit 20 and the AC converter circuit 30 in accordance with information stored in the storage unit 44. In the storage unit 44, for example, information about the current value, frequency, duty ratio and waveform of the AC current I for discharge lamp driving may be stored.

The power control circuit controller 42 outputs a current control signal to the power control circuit 20 in accordance with a control signal from the system controller 41, thereby controlling the power control circuit 20.

The AC converter circuit controller 43 outputs an inversion control signal to the AC converter circuit 30 in accordance with a control signal from the system controller 41, thereby controlling the AC converter circuit 30.

The discharge lamp lighting device 10 may include an operation detecting unit 60. The operation detecting unit 60 may detect the operation of the discharge lamp 90, for example, the discharge lamp driving voltage of the discharge lamp or the AC current I for discharge lamp driving, and output driving voltage information or driving current information. In this embodiment, the operation detecting unit 60 includes first to third resistors 61 to 63.

The operation detecting unit 60 detects the discharge lamp driving voltage by using a voltage divided by the first and second resistors 61 and 62, which are connected parallel to the discharge lamp 90 and connected in series with each other. The operation detecting unit 60 detects the AC current I for discharge lamp driving by using a voltage generated at the third resistor 63, which is connected in series with the discharge lamp 90.

The discharge lamp lighting device 10 may include an igniter circuit 70. The igniter circuit 70 operates only when lighting of the discharge lamp 90 starts. When lighting of the discharge lamp 90 starts, the igniter circuit 70 supplies, between the electrodes of the discharge lamp 90, a high voltage (a higher voltage than in normal control operation) that is necessary to cause dielectric breakdown between the electrodes of the discharge lamp 90 and thus form a discharge path. In this embodiment, the igniter circuit 70 is connected parallel to the discharge lamp 90.

FIG. 4A to FIG. 4D are explanatory views showing the relation between the polarity of driving power supplied to the discharge lamp 90 and the temperature of the electrodes. FIG. 4A and FIG. 4B shows the operation state of the two electrodes 92 and 93. In FIG. 4A and FIG. 4B, the distal ends of the two electrodes 92 and 93 are shown. Protrusions 552p and 562p are provided at the distal ends of the electrodes 92 and 93, respectively. Discharge occurs between these protrusions 552p and 562p. In this example, shift of the discharge position (arc position) in each of the electrodes 92 and 93 can be restrained, compared with the case with no protrusions. However, such protrusions may be omitted.

FIG. 4A shows a first polarity state P1 in which the first electrode 92 operates as the anode and the second electrode 93 operates as the cathode. In the first polarity state P1, discharge causes electrons to move from the second electrode 93 (cathode) to the first electrode 92 (anode). Electrons are released from the cathode (second electrode 93). The electrons released from the cathode (second electrode 93) collide with the distal end of the anode (first electrode 92). This collision generates heat and the temperature of the distal end (protrusion 552p) of the anode (first electrode 92) rises.

FIG. 4B shows a second polarity state P2 in which the first electrode 92 operates as the cathode and the second electrode 93 operates as the anode. In the second polarity state P2, as opposed to the first polarity state P1, electrons move from the first electrode 92 to the second electrode 93. Consequently, the temperature of the distal end (protrusion 562p) of the second electrode 93 rises.

In this manner, the temperature of the anode tends to be higher than that of the cathode. The continued state where the temperature of one electrode is higher than that of the other electrode can cause various troubles. For example, if the distal end of the electrode with the higher temperature is excessively melted, unintended deformation of the electrode can occur. Consequently, the arc length may deviate from its proper value. Meanwhile, if the distal end of the electrode with the lower temperature is melted insufficiently, small recesses and protrusions generated at the distal end can remain without being melted. Consequently, a so-called arc jump may occur (the arc position is unstable and shifts).

As a technique of restraining such troubles, AC driving to repeat switching the polarity of each electrode can be used. FIG. 4C is a timing chart showing AC power (driving signal) supplied to the discharge lamp 90 (FIG. 2). The horizontal axis represents time T. The vertical axis represents current I. The current I is a current flowing through the discharge lamp 90. A positive value represents the first polarity state P1. A negative value represents the second polarity state P2. In the example shown in FIG. 4C, a rectangular AC current is used. The first polarity state P1 and the second polarity state P2 are alternately repeated. Here, a first polarity section Tp represents a time period during which the first polarity state P1 continues. A second polarity section Tn represents a time period during which the second polarity state P2 continues. The average current value in the first polarity section Tp is +A0. The average current value in the second polarity section Tn is −A0. The driving frequency can be experimentally decided in accordance with the characteristics of the discharge lamp 90 (for example, a value in the range of 30 Hz to 1 kHz is employed). Similarly, the other values +A0, −A0, Tp and Tn can be decided experimentally.

FIG. 4D is a timing chart showing temperature change in the first electrode 92. The horizontal axis represents time T. The vertical axis represents temperature H. The temperature H of the first electrode 92 rises in the first polarity state P1. The temperature H of the first electrode 92 falls in the second polarity state P2. Since the first polarity state P1 and the second polarity state P2 are repeated, the temperature H changes cyclically between a minimum value Hmin and a maximum value Hmax. Although not shown, the temperature of the second electrode 93 changes in the reverse phase of the temperature H of the first electrode 92. That is, the temperature of the second electrode 93 falls in the first polarity state P1. The temperature of the second electrode 93 rises in the second polarity state P2.

In the first polarity state P1, the distal end of the first electrode 92 (protrusion 552p) melts and therefore the distal end of the first electrode 92 (protrusion 552p) becomes smooth. Thus, shift of the discharge position in the first electrode 92 can be restrained. Meanwhile, the temperature of the distal end of the second electrode 93 (protrusion 562p) falls and therefore excessive melting of the second electrode 93 (protrusion 562p) is restrained. Thus, unintended deformation of the electrode can be restrained. In the second polarity state P2, the conditions of the first electrode 92 and the second electrode 93 are reversed. Thus, as the two states P1 and P2 are repeated, troubles in the two electrodes 92 and 93 can be restrained.

Now, if the waveform of the current I is symmetrical, that is, if the waveform of the current I satisfies the condition of "|+A0|=|−A0| and Tp=Tn", the two electrodes 92 and 93 have the same condition of power supplied thereto. Therefore, the difference in temperature between the two electrodes 92 and 93 is estimated to be small. However, if driving with such a symmetrical current waveform is maintained, a steady convection current is generated in the discharge space 91, and the electrode material may be deposited or causes to segregate locally at the axial part of the electrodes and may grow in a needle-shape. This may cause unintended discharge toward the wall surface of the light-transmissive material surrounding the discharge space 91. Such unintended discharge degrades this inner wall and may cause reduction in the life of the discharge lamp 90. Moreover, if driving with such a symmetrical current waveform is maintained, a constant temperature distribution of the electrodes is continued for a long time. Therefore, asymmetry of the electrodes generated by state change with time tends to be further promoted with time.

(2) Exemplary Control of Discharge Lamp Lighting Device

Next, a specific example of controlling the discharge lamp lighting device 10 according to this embodiment will be described.

The control unit 40 of the discharge lamp lighting device 10 according to this embodiment carries out control to change, in a cyclical pattern, cumulative energy supplied to each of the electrodes 92 and 93 of the discharge lamp in one cycle of the AC current for discharge lamp driving. This cyclical pattern includes plural sectional periods in which the cumulative energy supplied to each of the electrodes 92 and 93 of the discharge lamp is maintained at the same value over plural cycles of the AC current I for discharge lamp driving, and in this pattern, the cumulative energy supplied to each of the electrodes 92 and 93 of the discharge lamp differs between at least two of the sectional periods.

The control unit 40 also receives a power control signal S from outside, then carries out current control processing in which the average value of the DC current Id outputted from the power control circuit 20 in the section corresponding to one cycle of the AC current I for discharge lamp driving is regarded as the current value corresponding to the power control signal S, and controls the length of the sectional period in association with the average value of the DC current Id. For example, the control unit 40 may carry out control to reduce the length of the sectional period as the average value of the DC current Id is reduced.

The cumulative energy is equivalent to the electric energy supplied from the discharge lamp lighting device during the period when each of the electrodes 92 and 93 is the anode.

With this control, the cumulative energy supplied to each of the electrodes 92 and 93 of the discharge lamp 90 in one cycle is changed in the cyclical pattern including plural sectional periods in which the cumulative energy supplied to each of the electrodes 92 and 93 of the discharge lamp 90 in one cycle is maintained at the same value over plural cycles of the AC current for discharge lamp driving. Therefore, while the cumulative energy supplied to each of the electrodes 92 and 93 of the discharge lamp 90 in one cycle of the AC current I is changed in the cyclical pattern including plural sectional periods, the cumulative energy supplied to each of the electrodes 92 and 93 of the discharge lamp 90 in one cycle of the AC current I can be temporarily fixed in at least one sectional period.

That is, the thermal state of the two electrodes 92 and 93 and their peripheries can be largely varied on a relatively long time scale. Thus, formation of a stationary convection current within the discharge lamp 90 can be restrained and uneven wear of the electrodes 92 and 93 and uneven precipitation of the electrode material can be prevented.

The temperature of the electrode where the cumulative energy supplied in one cycle is smaller, of the electrodes of the discharge lamp 90, has a lower temperature than the other electrode. Particularly in the case where the driving power of the discharge lamp 90 is small, power (energy) supplied to each of the electrodes 92 and 93 is small and therefore the temperature of the electrodes is low. The driving power of the discharge lamp 90 is proportional to the DC current Id.

With the control of the discharge lamp lighting device 10 according to this embodiment, as the length per sectional period is controlled in association with the average value of the DC current Id, that is, the driving power of the discharge lamp 90, the temperature of the electrodes can be prevented from being low for a long time. Therefore, occurrence of flicker at the time of low-power driving can be restrained. For example, if such control is carried out that the length of the sectional period is reduced as the average value of the DC current Id is reduced, the low-temperature state of the electrode where the cumulative energy supplied in one cycle is smaller, of the electrodes of the discharge lamp 90, can be prevented from continuing for a long time.

The cumulative energy supplied to each of the electrodes 92 and 93 may be controlled in accordance with the duty ratio of the AC current I for discharge lamp driving or in accordance with the current value of the AC current I for discharge lamp driving.

The case of controlling the cumulative energy supplied to each of the electrodes 92 and 93 in accordance with the duty ratio of the AC current I for discharge lamp driving will now be described with reference to FIG. 1 to FIG. 12. Here, the duty ratio of the AC current I for discharge lamp driving is the proportion of the first polarity section Tp in one cycle of the AC current I.

In this case, the control unit 40 carries out AC conversion control processing to change the duty ratio of the AC current I for discharge lamp driving in a cyclical pattern. This cyclical pattern includes plural sectional periods in which the duty ratio of the AC current I for discharge lamp driving is maintained at the same value over plural cycles of the AC current I for discharge lamp driving. In this pattern, the duty ratio of the AC current I for discharge lamp driving differs between at least two of the sectional periods.

The control unit 40 receives the power control signal S from outside, then carries out current control processing in which the average value of the DC current Id outputted from the power control circuit 20 in the section corresponding to one cycle of the AC current I for discharge lamp driving is regarded as the current value corresponding to the power control signal S, and AC conversion control processing to control the length per sectional period in association with the average value of the DC current Id outputted from the power control circuit 20. For example, the control unit 40 may carry out AC conversion control processing to reduce the length per sectional period as the average value of the DC current Id, that is, the driving power of the discharge lamp 90, is reduced.

Figure 5:
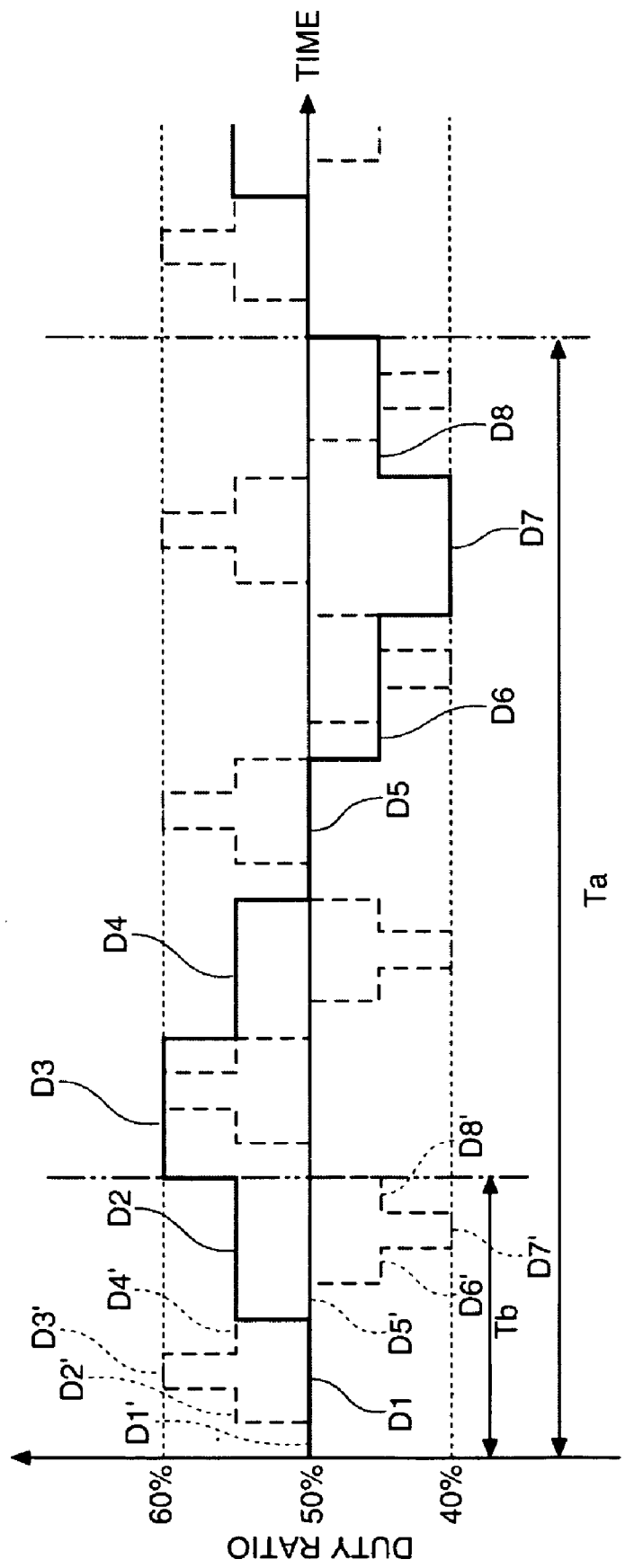
FIG. 5 is a view for explaining an exemplary control of a discharge lamp lighting device according to an embodiment of the invention.

FIG. 5 shows an exemplary cyclical pattern to change the duty ratio of the AC current I for discharge lamp driving. The horizontal axis represents time. The vertical axis represents duty ratio. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W. The driving power of 200 W is the substantially average power per cycle in the first cyclical pattern. The driving power of 160 W is the substantially average power per cycle in the second cyclical pattern.

In the case where the driving power of the discharge lamp 90 is 200 W, the control unit 40 carries out AC conversion control processing to change the duty ratio stepwise in the period of one cycle Ta of the first cyclical pattern including eight sectional periods (sectional periods D1 to D8) in which the duty ratio of the AC current I for discharge lamp driving is maintained at the same value. That is, a sectional period is a period during which the same AC conversion control processing continues, as viewed in terms of one cycle of the AC current I for discharge lamp driving. In this embodiment, the length per sectional period in the first cyclical pattern is eight seconds.

Similarly, in the case where the driving power of the discharge lamp 90 is 160 W, AC conversion control processing is carried out to change the duty ratio stepwise in the period of one cycle Tb of the second cyclical pattern including eight sectional periods (sectional periods D1' to D8') in which the duty ratio of the AC current I for discharge lamp driving is maintained at the same value. In this embodiment, the length per sectional period in the second cyclical pattern is two seconds, which is shorter than in the case where the driving power of the discharge lamp 90 is 200 W.

The control in the case where the driving power of the discharge lamp 90 is 200 W will be now be described. The duty ratio is 50% in the sectional period D1, is then raised by 5% each, and reaches the maximum level of 60% in the sectional period D3. After that, the duty ratio is lowered by 5% each and reaches the minimum level of 40% in the sectional period D7. After that, the duty ratio is raised by 5% each, and increase and decrease of the duty ratio is repeated with the cycle Ta.

Similarly, in the case where the driving power of the discharge lamp 90 is 160 W, the duty ratio is increased and decreased by 5% each. The increase and decrease of the duty ratio is repeated with the shorter cycle Tb than in the case where the driving power of the discharge lamp 90 is 200 W.

Figure 6A:
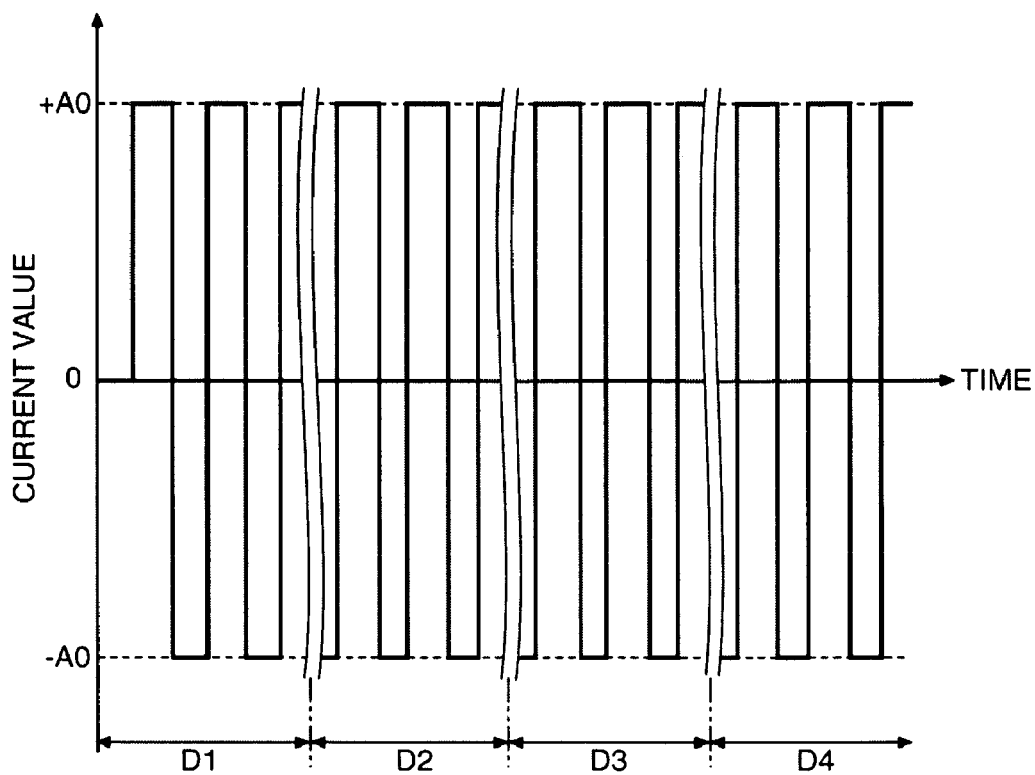
FIG. 6A and FIG. 6B are views for explaining an exemplary control of a discharge lamp lighting device according to an embodiment of the invention.
Figure 6B:
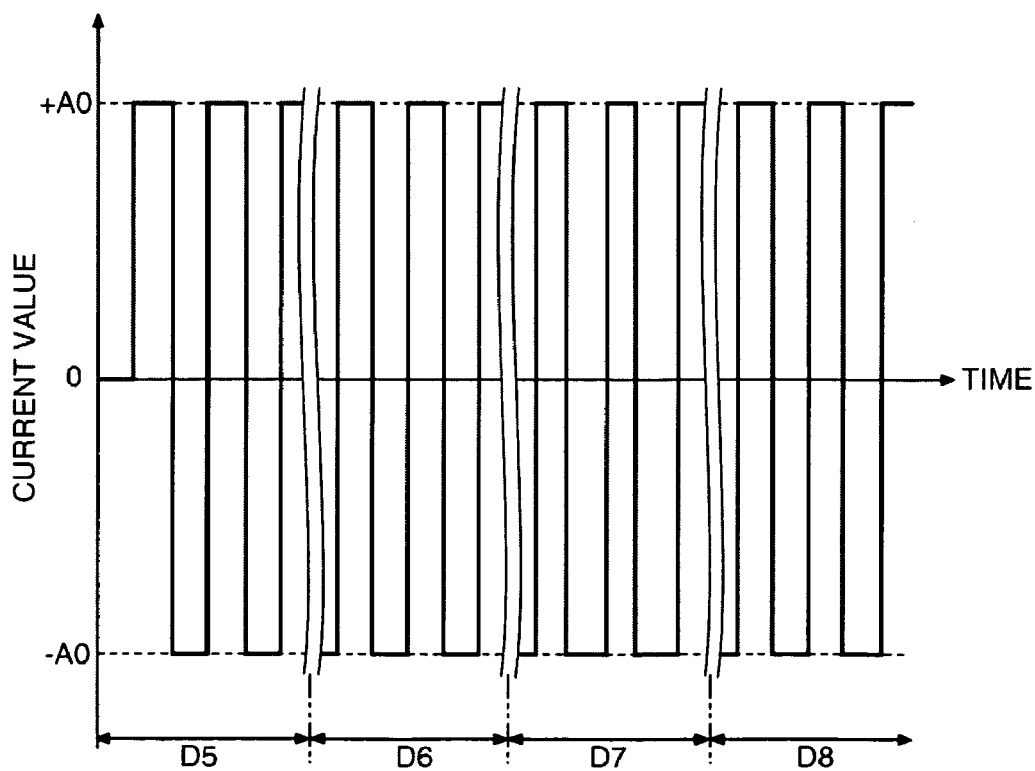

FIG. 6A and FIG. 6B show waveform transition of the AC current I for discharge lamp driving in the case where the duty ratio is changed in the cyclical pattern shown in FIG. 5. The horizontal axis represents time. The vertical axis represents current value. In this embodiment, current control processing is carried out to achieve an average current of +A0 in the first polarity section Tp and an average current of −A0 in the second polarity section Tn. Hereinafter, waveform transition in the case where the driving power of the discharge lamp 90 is 200 W will be described. However, similar waveform transition can be seen in the case where the driving power of the discharge lamp 90 is 160 W, except for the length per sectional period.

FIG. 6A shows waveform transition of the AC current I from the sectional period D1 to the sectional period D4 shown in FIG. 5. In the sectional period D1, a current waveform with a duty ratio of 50% continues. When the sectional period D2 starts, this changes to a current waveform with a duty ratio of 55%, which continues during the sectional period D2. When the sectional period D3 starts, this changes to a current waveform with a duty ratio of 60%, which continues during the sectional period D3. When the sectional period D4 starts, this changes to a current waveform with a duty ratio of 55%, which continues during the sectional period D4.

FIG. 6B shows waveform transition of the AC current I from the sectional period D5 to the sectional period D8 shown in FIG. 5. In the sectional period D5, a current waveform with a duty ratio of 50% continues. When the sectional period D6 starts, this changes to a current waveform with a duty ratio of 55%, which continues during the sectional period D6. When the sectional period D7 starts, this changes to a current waveform with a duty ratio of 60%, which continues during the sectional period D7. When the sectional period D8 starts, this changes to a current waveform with a duty ratio of 55%, which continues during the sectional period D8.

When the difference between the duty ratio of the AC current I for discharge lamp driving and the reference duty ratio of 50% is increased, the temperature of the electrode which serves as the anode for a longer period during one cycle of the AC current I for discharge lamp driving rises, but the temperature of the other electrode falls. This tendency becomes more conspicuous as the difference between the duty ratio and the reference duty ratio of 50% increases. Therefore, the possibility of occurrence of flicker increases at the electrode with the lowered temperature. This possibility further increases if the discharge lamp 90 is driven with low power.

Thus, in this embodiment, in order to minimize the time when the electrode temperature is lowered, the length per sectional period of the sectional periods D1' to D8' in the case of driving the discharge lamp 90 with low power, that is, in the case where the driving power of the discharge lamp 90 is 160 W, is made shorter than that of the sectional periods D1 to D8 where the driving power of the discharge lamp 90 is 200 W. Thus, occurrence of flicker at the time of low-power driving can be restrained.

Figure 7:
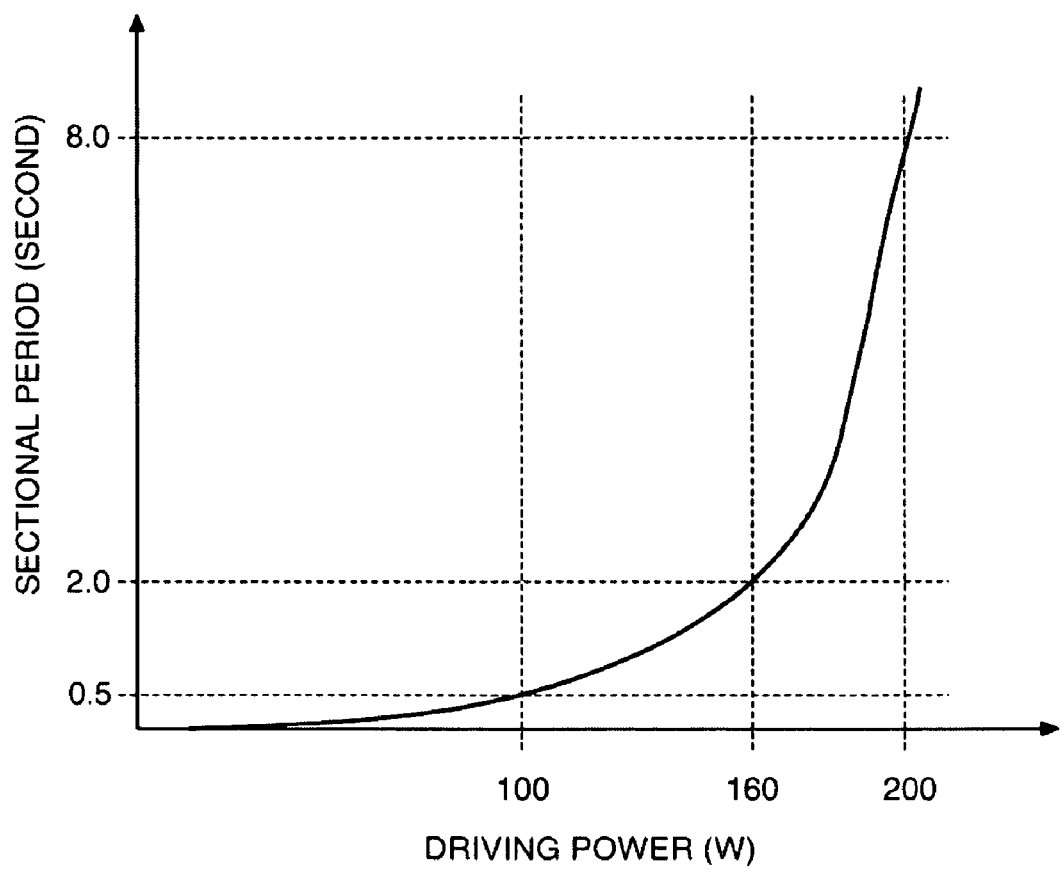
FIG. 7 is a view for explaining an exemplary control of a discharge lamp lighting device according to an embodiment of the invention.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90 and the length per sectional period may be predetermined, for example, as shown in the graph of FIG. 7, and the correspondence data may be stored, for example, in the storage unit 44 of the control unit 40.

First Modification

The cyclical pattern to change the duty ratio of the AC current I for discharge lamp driving is not limited to the above example. The control unit 40 may carry out AC conversion control processing to change the duty ratio in another cyclical pattern including plural sectional periods in which the duty ratio of the AC current I for discharge lamp driving is maintained at the same value, in such a manner that the duty ratio differs between at least two of the plural sectional periods.

For example, the control unit 40 may carry out AC conversion control processing to control the length per sectional period in association with the difference between the duty ratio of the AC current I for discharge lamp driving and a predetermined reference duty ratio. As an example of this, the case where the control unit 40 carries out AC conversion control processing to reduce the length per sectional period as the difference between the duty ratio of the AC current I for discharge lamp driving and a predetermined reference duty ratio is increased will be described hereinafter.

Figure 8:
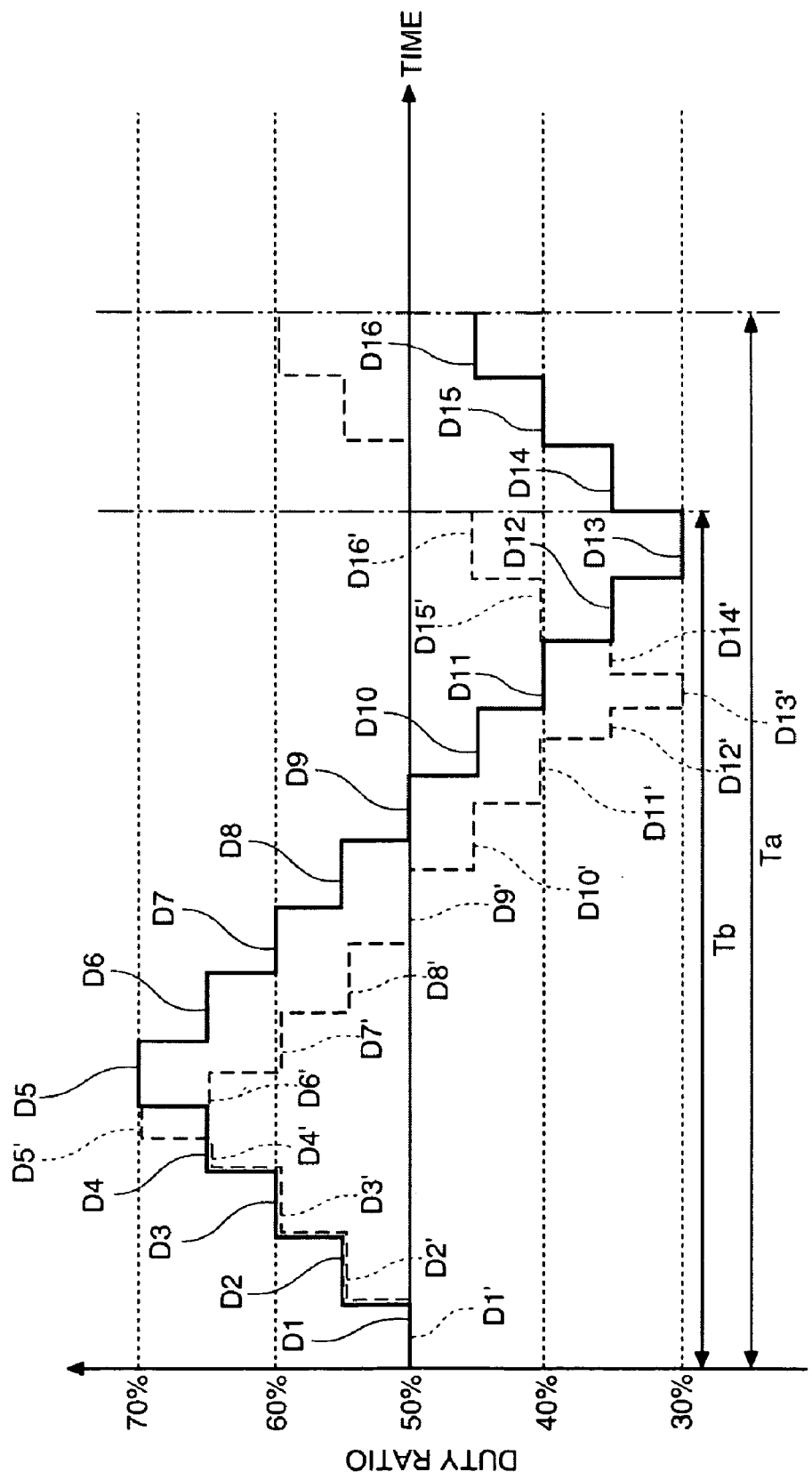
FIG. 8 is a view for explaining an exemplary control of a discharge lamp lighting device according to an embodiment of the invention.

FIG. 8 shows an exemplary cyclical pattern to change the duty ratio of the AC current I for discharge lamp driving. The horizontal axis represents time. The vertical axis represents duty ratio. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W.

In the case where the driving power of the discharge lamp 90 is 200 W, the control unit 40 carries out AC conversion control processing to change the duty ratio stepwise in the period of one cycle Ta of the first cyclical pattern including 16 sectional periods (sectional periods D1 to D16) in which the duty ratio of the AC current I for discharge lamp driving is maintained at the same value. In this embodiment, the length per sectional period is four seconds.

Similarly, in the case where the driving power of the discharge lamp 90 is 160 W, AC conversion control processing is carried out to change the duty ratio stepwise in the period of one cycle Tb of the second cyclical pattern including 16 sectional periods (sectional periods D1' to D16') in which the duty ratio of the AC current I for discharge lamp driving is maintained at the same value. In this embodiment, if the duty ratio is 40% or more and 60% or less, the length per sectional period with the driving power of 160 W is four seconds, which is the same as in the case where the driving power of the discharge lamp 90 is 200 W. However, if the duty ratio is lower than 40% or higher than 60%, the length per sectional period is two seconds, which is shorter than in the case where the driving power of the discharge lamp 90 is 200 W.

That is, the length per sectional period is four seconds in the sectional periods D1' to D3', two seconds in the sectional periods D4' to D6', four seconds in the sectional periods D7' to D11', two seconds in the sectional periods D12' to D14', and four seconds in the sectional periods D15' and D16'.

In this manner, in the control where the length per sectional period in the case of driving the discharge lamp 90 with low power is made shorter than the length per sectional period in the case of driving the discharge lamp 90 with high driving power, also in the case where control is carried out to reduce the length of the sectional period as the difference between the duty ratio of the AC current I for discharge lamp driving and the predetermined reference duty ratio (in this embodiment, 50%) is increased, the low-temperature state of the electrodes of the discharge lamp 90 can be prevented from continuing for a long time when driving the discharge lamp 90 with low power. Therefore, occurrence of flicker at the time of low-power driving can be restrained.

Figure 9:
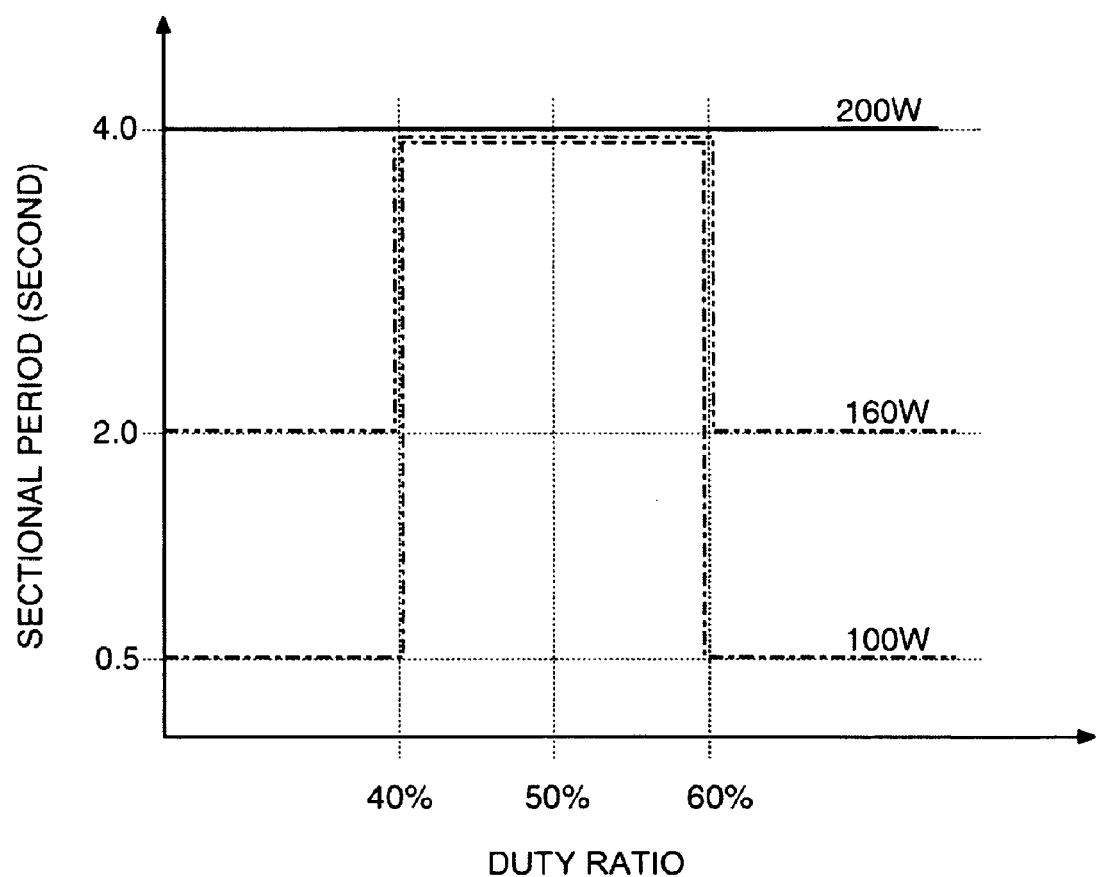
FIG. 9 is a view for explaining an exemplary control of a discharge lamp lighting device according to an embodiment of the invention.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90, the length per sectional period and the duty ratio may be predetermined, for example, as shown in the graph of FIG. 9, and the correspondence data may be stored, for example, in the storage unit 44 of the control unit 40.

Second Modification

In the above embodiment, the maximum value and the minimum value of the duty ratio are constant irrespective of the driving power of the discharge lamp 90. However, AC conversion control processing may be carried out in which at least one of the difference between the maximum value of the duty ratio and the reference duty ratio and the difference between the minimum value of the duty ratio and the reference duty ratio is increased as the driving power of the discharge lamp 90 is reduced. As an example, the case of increasing both the difference between the maximum value of the duty ratio and the reference duty ratio and the difference between the minimum value of the duty ratio and the reference duty ratio as the driving power of the discharge lamp 90 is reduced will be described hereinafter.

Figure 10:
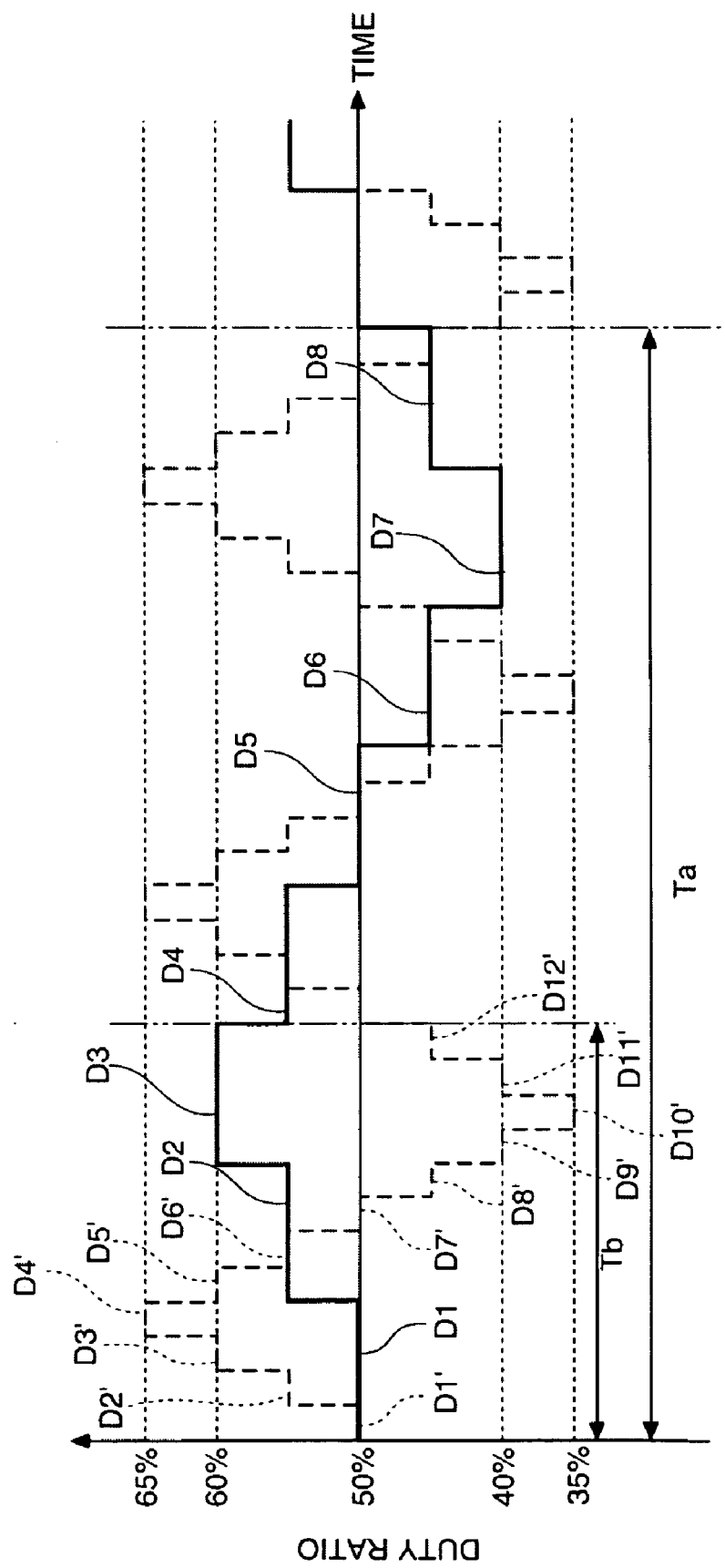
FIG. 10 is a view for explaining an exemplary control of a discharge lamp lighting device according to an embodiment of the invention.

FIG. 10 shows an exemplary cyclical pattern to change the duty ratio of the AC current I for discharge lamp driving. The horizontal axis represents time. The vertical axis represents duty ratio. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W.

In the case where the driving power of the discharge lamp 90 is 200 W, the control unit 40 carries out AC conversion control processing to change the duty ratio stepwise in the period of one cycle Ta of the first cyclical pattern including eight sectional periods (sectional periods D1 to D8) in which the duty ratio of the AC current I for discharge lamp driving is maintained at the same value. In this embodiment, the length per sectional period is eight seconds.

Similarly, in the case where the driving power of the discharge lamp 90 is 160 W, AC conversion control processing is carried out to change the duty ratio stepwise in the period of one cycle Tb of the second cyclical pattern including 12 sectional periods (sectional periods D1' to D12') in which the duty ratio of the AC current I for discharge lamp driving is maintained at the same value. In this embodiment, the length per sectional period is two seconds, which is shorter than in the case where the driving power of the discharge lamp 90 is 200 W.

The control in the case where the driving power of the discharge lamp 90 is 200 W is similar to the case of FIG. 5. However, the maximum value of the duty ratio is 60% and the minimum value is 40%.

The control in the case where the driving power of the discharge lamp 90 is 160 W will now be described. The duty ratio is 50% in the sectional period D1', is then raised by 5% each, and reaches the maximum level of 65% in the sectional period D4'. After that, the duty ratio is lowered by 5% each and reaches the minimum level of 35% in the sectional period D7'. After that, the duty ratio is raised by 5% each, and increase and decrease of the duty ratio is repeated with the cycle Tb.

In this manner, the control to increase at least one of the difference between the maximum value of the duty ratio and the reference duty ratio and the difference between the minimum value of the duty ratio and the reference duty ratio as the driving power of the discharge lamp 90 is reduced, is combined in addition to the control where the length per sectional period in the case of driving the discharge lamp 90 with low power is made shorter than the length per sectional period in the case of driving the discharge lamp 90 with high driving power. Thus, the low-temperature state of the electrodes of the discharge lamp 90 can be prevented from continuing for a long time when driving the discharge lamp 90 with low power, and also in the case where the discharge lamp 90 is driven with lower power and the length per sectional period is reduced, the electrode temperature can be changed substantially. Therefore, occurrence of flicker at the time of low-power driving can be restrained. Moreover, formation of a stationary convection current within the discharge lamp 90 can be restrained and uneven wear of the electrodes and uneven precipitation of the electrode material can be prevented.

Figure 11:
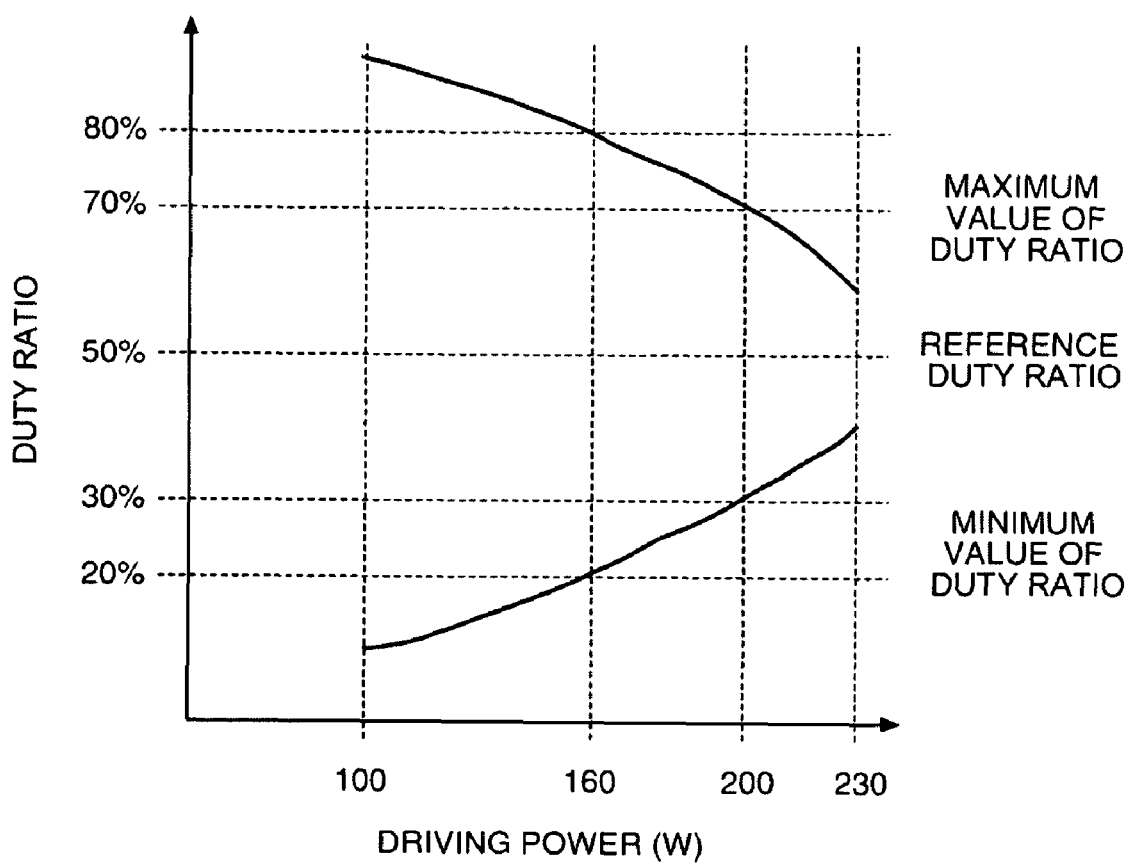
FIG. 11 is a view for explaining an exemplary control of a discharge lamp lighting device according to an embodiment of the invention.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90 and the range of the duty ratio may be predetermined, for example, as shown in the graph of FIG. 11, and the correspondence data may be stored, for example, in the storage unit 44 of the control unit 40.

Other Modifications

It is possible to combine the control to reduce the length per sectional period as the difference between the duty ratio of the AC current I for discharge lamp driving and the predetermined reference duty ratio (in this embodiment, 50%) is increased, as described in the first modification, and the control to increase at least one of the difference between the maximum value of the duty ratio and the reference duty ratio and the difference between the minimum value of the duty ratio and the reference duty ratio as the driving power of the discharge lamp 90 is reduced, as described in the second modification, with the control where the length per sectional period in the case of driving the discharge lamp 90 with low power is made shorter than the length per sectional period in the case of driving the discharge lamp 90 with high driving power.

With such a combination of the controls, occurrence of flicker at the time of low-power driving can be restrained further. Moreover, formation of a stationary convection current within the discharge lamp 90 can be restrained and uneven wear of the electrodes and uneven precipitation of the electrode material can be prevented.

In the above embodiment, the frequency of the AC current I for discharge lamp driving is fixedly controlled. However, the control unit 40 may carry out AC conversion control processing to control the frequency of the AC current I for discharge lamp driving in association with the average value of the DC current Id outputted from the power control circuit 20. For example, the control unit 40 may carry out AC conversion control processing to increase the frequency of the AC current I for discharge lamp driving as the average value of the DC current Id outputted from the power control circuit 20 is reduced.

Figure 12:
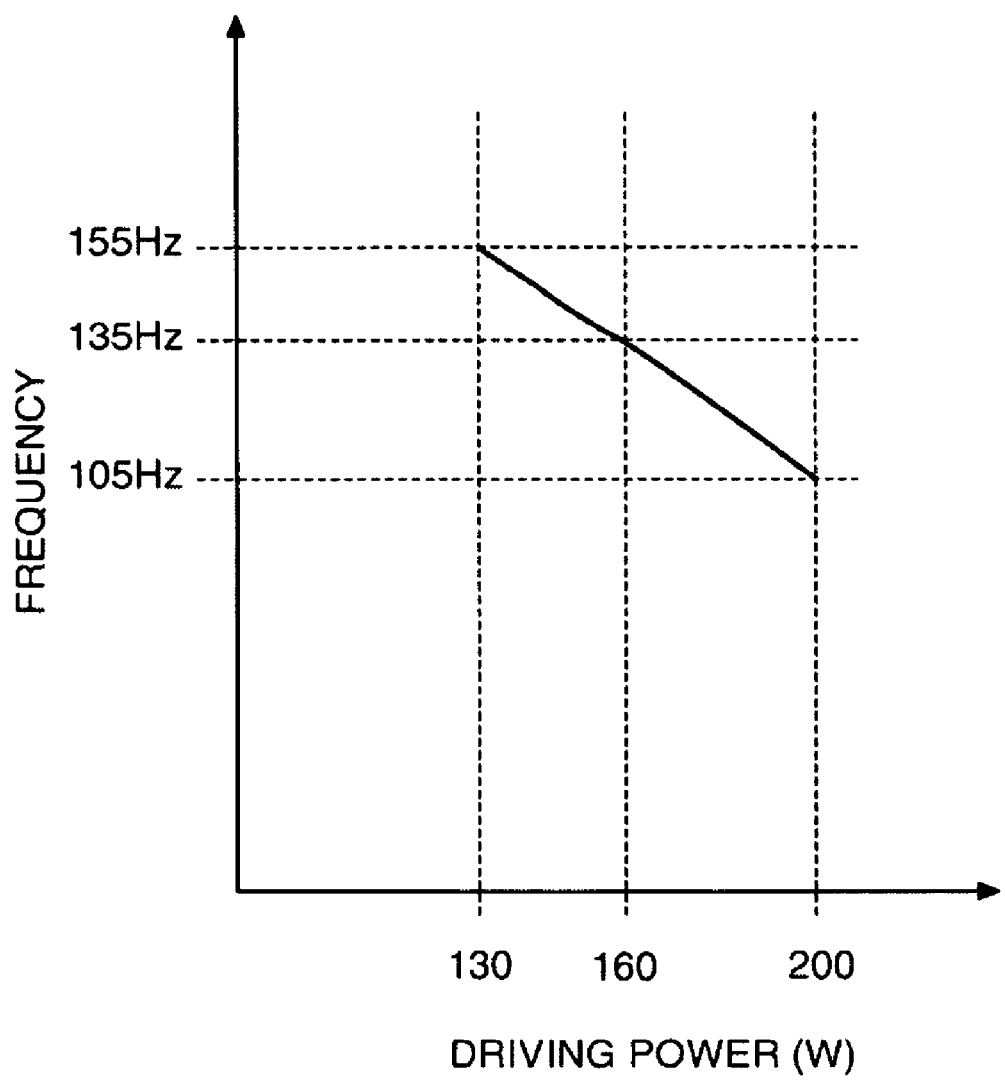
FIG. 12 is a view for explaining an exemplary control of a discharge lamp lighting device according to an embodiment of the invention.

In such case, the correspondence between the driving power of the discharge lamp 90 and the frequency of the AC current I for discharge lamp driving may be predetermined, for example, as shown in the graph of FIG. 12, and the correspondence data may be stored, for example, in the storage unit 44 of the control unit 40.

In this manner, the control to increase the frequency of the AC current I for discharge lamp driving as the current value of the DC current Id outputted from the power control circuit 20 is reduced is combined in addition to the control to cause the length per sectional period in the case of driving the discharge lamp 90 with low power to be shorter than the length per sectional period in the case of driving the discharge lamp 90 with high driving power. Thus, flicker can be restrained further.

3. Discharge Lamp Lighting Device According to Second Embodiment

The case of controlling the cumulative energy supplied to each electrode by using the current value of the AC current I for discharge lamp driving will now be described with reference to FIG. 1 to FIG. 4A-4D and FIG. 12 to FIG. 19. The elements of configuration similar to those of the first embodiment are denoted by the same reference numerals and will not be described further in detail.

In the discharge lamp lighting device according to the second embodiment, the control unit 40 carries out sectional current control processing to change, in a cyclical pattern, the difference in absolute value between the current value of the AC current I for discharge lamp driving in the first polarity section and the current value in the second polarity section. This cyclical pattern includes plural sectional periods in which the difference in absolute value between the current value in the first polarity section and the current value in the second polarity section is maintained at the same value over plural cycles of the AC current I for discharge lamp driving. In this pattern, the difference in absolute value between the current value in the first polarity section and the current value in the second polarity section differs between at least two of the sectional periods.

The control unit 40 also receives a power control signal S from outside, and carries out sectional current control processing in which the average value of the DC current Id outputted from the power control circuit 20 in the section corresponding to one cycle of the AC current I for discharge lamp driving is regarded as the current value corresponding to the power control signal S and in which the length of the sectional period is controlled in association with the average value of the DC current Id outputted from the power control circuit 20. For example, the control unit 40 may carry out sectional current control processing to reduce the length of the sectional period as the average value of the DC current Id, that is, the driving power of the discharge lamp 90, is reduced.

Figure 13:
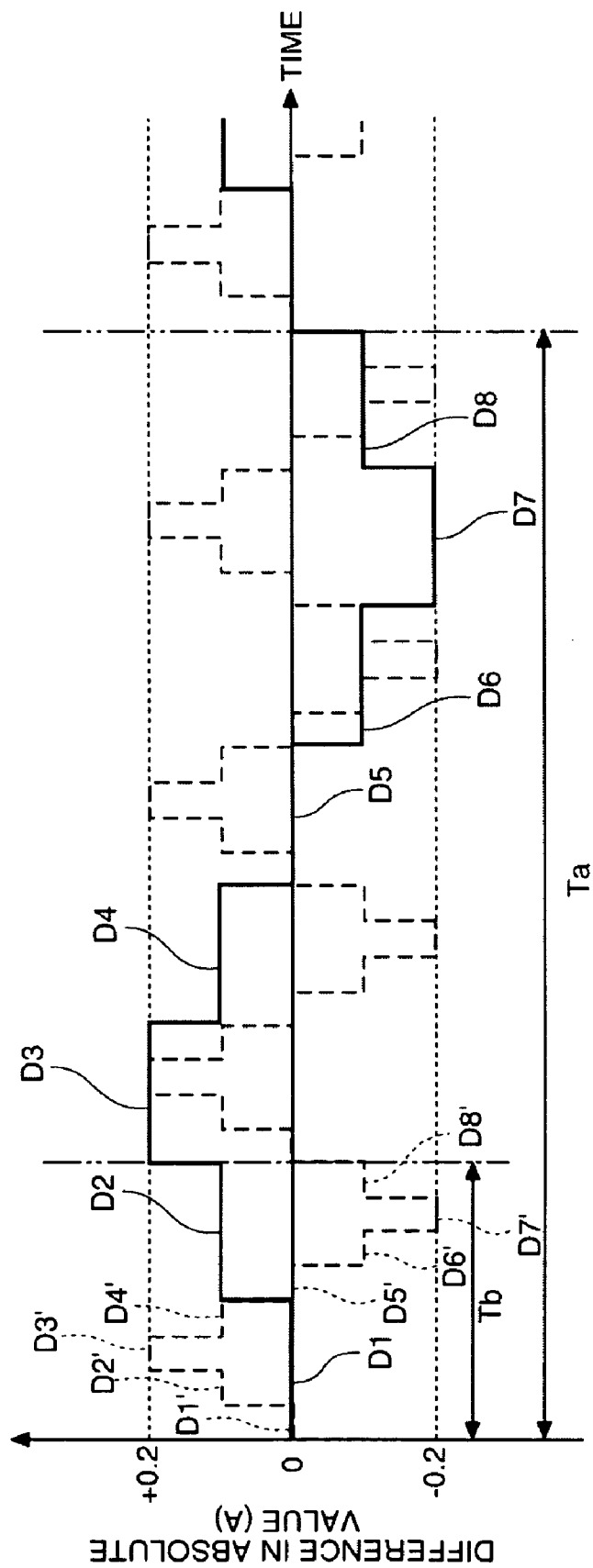
FIG. 13 is a view for explaining an exemplary control of a discharge lamp lighting device according to an embodiment of the invention.

FIG. 13 shows an exemplary cyclical pattern to change the difference in absolute value between the current value of the AC current I for discharge lamp driving in the first polarity section and the current value in the second polarity section. The horizontal axis represents time. The vertical axis represents the difference in absolute value between the current value of the AC current I for discharge lamp driving in the first polarity section and the current value in the second polarity section. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W.

In the case where the driving power of the discharge lamp 90 is 200 W, the control unit 40 carries out sectional current control processing to change the difference in absolute value between the current value of the AC current I for discharge lamp driving in the first polarity section and the current value in the second polarity section, stepwise in a first cyclical pattern of one cycle Ta including eight sectional periods (sectional periods D1 to D8) in which the difference in absolute value between the current value of the AC current I for discharge lamp driving in the first polarity section and the current value in the second polarity section is maintained at the same value. That is, a sectional period is a period during which the same sectional current control processing continues, as viewed in terms of one cycle of the AC current I for discharge lamp driving. In this embodiment, the length per sectional period is eight seconds.

Similarly, in the case where the driving power of the discharge lamp 90 is 160 W, sectional current control processing is carried out to change the difference in absolute value between the current value of the AC current I for discharge lamp driving in the first polarity section and the current value in the second polarity section, stepwise in a second cyclical pattern of one cycle Tb including eight sectional periods (sectional periods D1' to D8') in which the difference in absolute value between the current value of the AC current I for discharge lamp driving in the first polarity section and the current value in the second polarity section is maintained at the same value. In this embodiment, the length per sectional period is two seconds, which is shorter than in the case where the driving power of the discharge lamp 90 is 200 W.

The control in the case where the driving power of the discharge lamp 90 is 200 W will now be described. In the sectional period D1, the difference in absolute value between the current value of the AC current I for discharge lamp driving in the first polarity section and the current value in the second polarity section is 0 A. After that, the difference in absolute value between the current value of the AC current I for discharge lamp driving in the first polarity section and the current value in the second polarity section is increased by 0.1 A each. The difference in absolute value between the current value of the AC current I for discharge lamp driving in the first polarity section and the current value in the second polarity section reaches the maximum level of +0.2 A in the sectional period D3.

After that, the difference in absolute value between the current value of the AC current I for discharge lamp driving in the first polarity section and the current value in the second polarity section is reduced by 0.1 A each. The difference in absolute value between the current value of the AC current I for discharge lamp driving in the first polarity section and the current value in the second polarity section reaches the minimum level of −0.2 A in the sectional period D7. After that, the difference in absolute value between the current value of the AC current I for discharge lamp driving in the first polarity section and the current value in the second polarity section is increased by 0.1 A each. Then, increase and decrease of the difference in absolute value between the current value of the AC current I for discharge lamp driving in the first polarity section and the current value in the second polarity section is repeated with the cycle Ta.

Similarly, in the case where the driving power of the discharge lamp 90 is 160 W, the difference in absolute value between the current value of the AC current I for discharge lamp driving in the first polarity section and the current value in the second polarity section is increased and decreased by 0.1 A each. The increase and decrease of the difference in absolute value between the current value of the AC current I for discharge lamp driving in the first polarity section and the current value in the second polarity section is repeated with the shorter cycle Tb than in the case where the driving power of the discharge lamp 90 is 200 W.

Next, a specific example of sectional current control processing in the discharge lamp lighting device 10 according to this embodiment will be described.

Figure 14A:
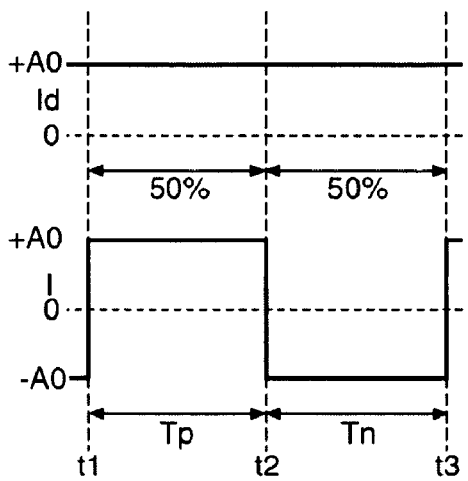
FIG. 14A to FIG. 14E are views for explaining an exemplary control of a discharge lamp lighting device according to an embodiment of the invention.
Figure 14D:
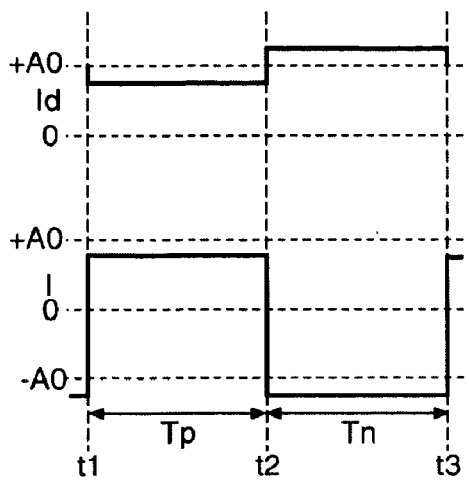

FIG. 14A shows the waveform of the DC current Id outputted from the power control circuit 20 and the AC current I for discharge lamp driving when the difference in absolute value between the current value of the AC current I for discharge lamp driving in the first polarity section Tp and the current value in the second polarity section Tn is 0 A. The horizontal axis represents time. The vertical axis represents current value. Times t1, t2 and t3 represent the polarity inversion timing of the AC current I for discharge lamp driving. In the section between times t1 and t2, the AC current I for discharge lamp driving has the first polarity (the first electrode 92 is the anode), and this is referred to as the first polarity section (section Tp). In the section between times t2 and t3, the AC current I for discharge lamp driving has the second polarity (the first electrode 92 is the cathode), and this is referred to as the second polarity section (section Tn). The combination of the section Tp and the section Tn forms one cycle of the AC current I. Here, the duty ratio of the AC current I for discharge lamp driving is the proportion of the first polarity section Tp in one cycle of the AC current I. In the examples shown in FIG. 14A to FIG. 14E, the duty ratio is assumed to be 50%.

In the example shown in FIG. 14A, sectional current control processing to cause the DC current Id outputted from the power control circuit 20 to have the same current value (+A0) in each of the section Tp and the section Tn is carried out. Consequently, the AC current I for discharge lamp driving has a current value (+A0) in the section Tp and a current value (−A0) in the section Tn. That is, the difference in absolute value between the current value of the AC current I for discharge lamp driving in the first polarity section and the current value in the second polarity section is 0 A.

Figure 14B:
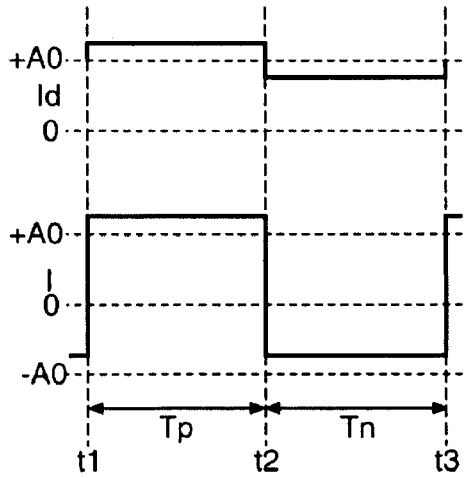
Figure 14E:
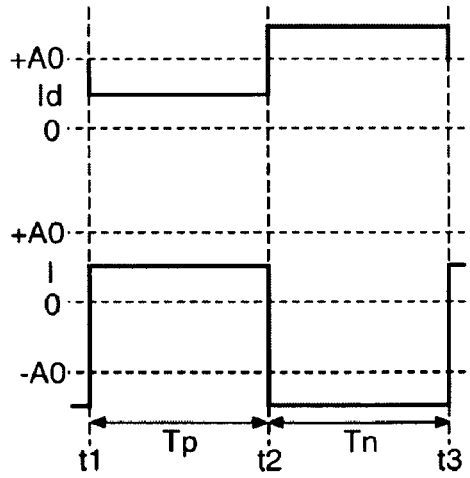
Figure 14:
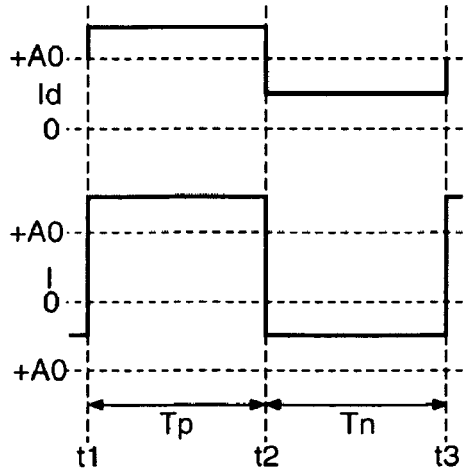

In the example shown in FIG. 14B, sectional current control processing to cause the DC current Id outputted from the power control circuit 20 to have a current value +A0+0.05 A in the section Tp and to cause the DC current Id outputted from the power control circuit 20 to have a current value +A0−0.05 A in the section Tn is carried out. Consequently, the AC current I for discharge lamp driving has a current value (+A0+0.05 A) in the section Tp and a current value (−A0+0.05 A) in the section Tn. The difference in absolute value between the current value of the AC current I for discharge lamp driving in the first polarity section and the current value in the second polarity section is +0.1 A.

Similarly, in the example shown in FIG. 14C, the difference in absolute value between the current value of the AC current I for discharge lamp driving in the first polarity section and the current value in the second polarity section is +0.2 A. In the example shown in FIG. 14D, the difference in absolute value between the current value of the AC current I for discharge lamp driving in the first polarity section and the current value in the second polarity section is −0.1 A. In the example shown in FIG. 14E, the difference in absolute value between the current value of the AC current I for discharge lamp driving in the first polarity section and the current value in the second polarity section is −0.2 A.

Figure 15A:
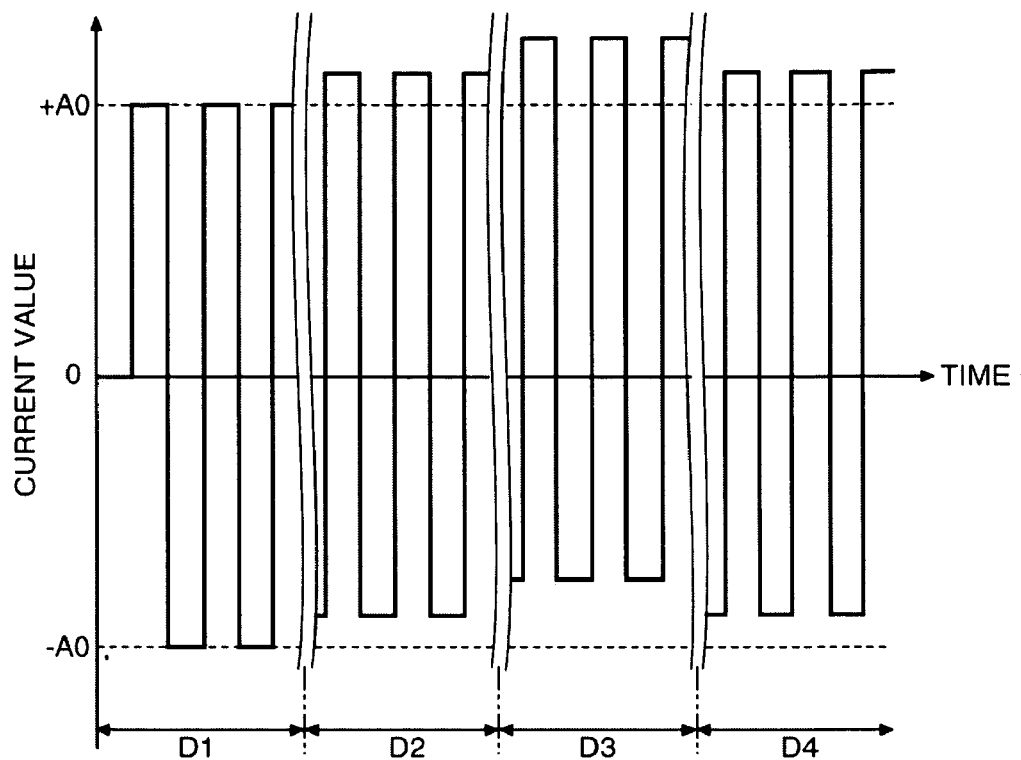
FIG. 15A and FIG. 15B are views for explaining an exemplary control of a discharge lamp lighting device according to an embodiment of the invention.

FIG. 15A and FIG. 15C show waveform transition of the AC current I for discharge lamp driving in the case where the difference in absolute value between the current value of the AC current I for discharge lamp driving in the first polarity section and the current value in the second polarity section is changed in the cyclical pattern shown in FIG. 13. The horizontal axis represents time. The vertical axis represents current value. Hereinafter, waveform transition in the case where the driving power of the discharge lamp 90 is 200 W will be described. However, similar waveform transition can be seen in the case where the driving power of the discharge lamp 90 is 160 W, except for the length per sectional period.

FIG. 15A shows waveform transition of the AC current I from the sectional period D1 to the sectional period D4 in FIG. 13. In the sectional period D1, a current waveform continues in which the difference in absolute value between the current value of the AC current I for discharge lamp driving in the first polarity section and the current value in the second polarity section is 0 A. When the sectional period D2 starts, the waveform changes to a current waveform in which the difference in absolute value between the current value of the AC current I for discharge lamp driving in the first polarity section and the current value in the second polarity section is +0.1 A. This waveform continues during the sectional period D2. When the sectional period D3 starts, the waveform changes to a current waveform in which the difference in absolute value between the current value of the AC current for discharge lamp driving in the first polarity section and the current value in the second polarity section is +0.2 A. This waveform continues during the sectional period D3. When the sectional period D4 starts, the waveform changes to a current waveform in which the difference in absolute value between the current value of the AC current I for discharge lamp driving in the first polarity section and the current value in the second polarity section is +0.1 A. This waveform continues during the sectional period D4.

Figure 15B:
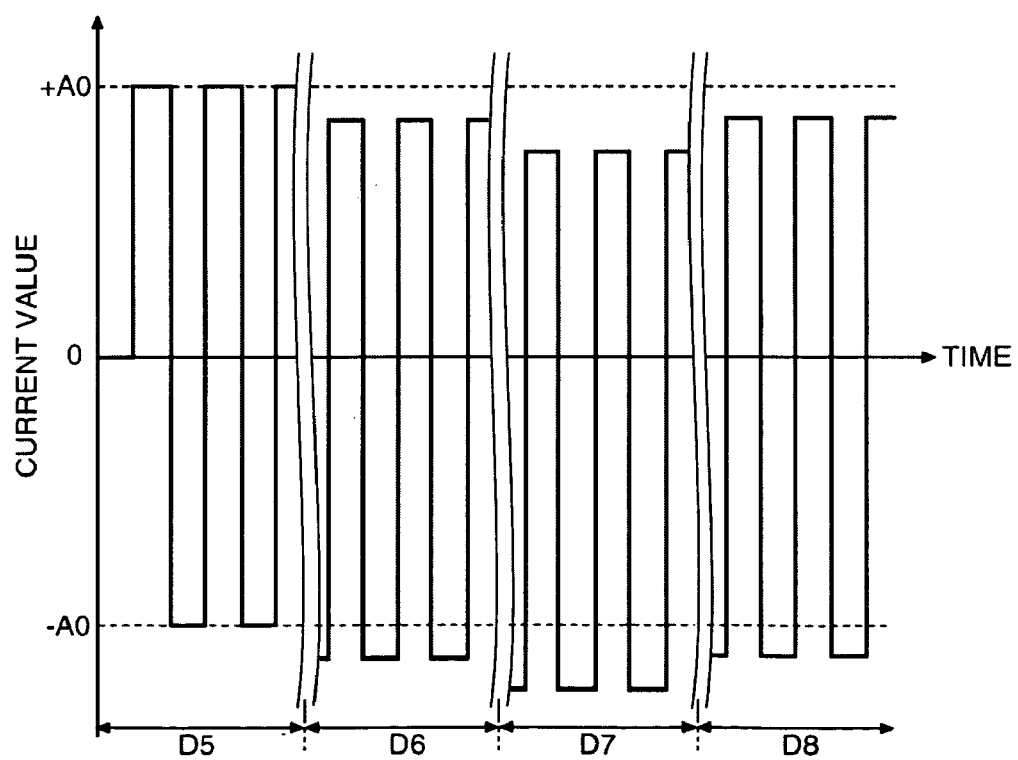

FIG. 15B shows waveform transition of the AC current I from the sectional period D5 to the sectional period D8 in FIG. 13. In the sectional period D5, a current waveform continues in which the difference in absolute value between the current value of the AC current I for discharge lamp driving in the first polarity section and the current value in the second polarity section is 0 A. When the sectional period D6 starts, the waveform changes to a current waveform in which the difference in absolute value between the current value of the AC current I for discharge lamp driving in the first polarity section and the current value in the second polarity section is −0.1 A. This waveform continues during the sectional period D6. When the sectional period D7 starts, the waveform changes to a current waveform in which the difference in absolute value between the current value of the AC current for discharge lamp driving in the first polarity section and the current value in the second polarity section is −0.2 A. This waveform continues during the sectional period D7. When the sectional period D8 starts, the waveform changes to a current waveform in which the difference in absolute value between the current value of the AC current I for discharge lamp driving in the first polarity section and the current value in the second polarity section is −0.1 A. This waveform continues during the sectional period D8.

When the difference in absolute value between the current value of the AC current I for discharge lamp driving in the first polarity section and the current value in the second polarity section becomes greater than 0, the temperature of the electrode which serves as the anode for a longer period during one cycle of the AC current I for discharge lamp driving rises, but the temperature of the other electrode falls. This tendency becomes more conspicuous as the difference in absolute value between the current value of the AC current I for discharge lamp driving in the first polarity section and the current value in the second polarity section increases. Therefore, the possibility of occurrence of flicker increases at the electrode with the lowered temperature. This possibility further increases if the discharge lamp 90 is driven with low power.

Thus, in this embodiment, in order to minimize the time when the electrode temperature is lowered, the length per sectional period of the sectional periods D1' to D8' in the case of driving the discharge lamp 90 with low power, that is, in the case where the driving power of the discharge lamp 90 is 160 W, is made shorter than that of the sectional periods D1 to D8 where the driving power of the discharger lamp 90 is 200 W. Thus, occurrence of flicker at the time of low-power driving can be restrained.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90 and the length per sectional period may be predetermined, for example, as shown in the graph of FIG. 7, and the correspondence data may be stored, for example, in the storage unit 44 of the control unit 40.

First Modification

The cyclical pattern to change the difference in absolute value between the current value of the AC current I for discharge lamp driving in the first polarity section and the current value in the second polarity section is not limited to the above example. The control unit 40 may carry out sectional current control processing to change the difference in absolute value between the current value of the AC current I for discharge lamp driving in the first polarity section and the current value in the second polarity section, in another cyclical pattern including plural sectional periods in which the difference in absolute value between the current value of the AC current I for discharge lamp driving in the first polarity section and the current value in the second polarity section is maintained at the same value, in such a manner that the difference in absolute value between the current value of the AC current I for discharge lamp driving in the first polarity section and the current value in the second polarity section differs between at least two of the plural sectional periods.

For example, the control unit 40 may carry out sectional current control processing to control the length per sectional period in association with the difference in absolute value between the current value of the AC current I for discharge lamp driving in the first polarity section and the current value in the second polarity section. As an example of this, the case where the control unit 40 carries out sectional current control processing to reduce the length per sectional period as the difference in absolute value between the current value of the AC current I for discharge lamp driving in the first polarity section and the current value in the second polarity section is increased will be described hereinafter.

Figure 16:
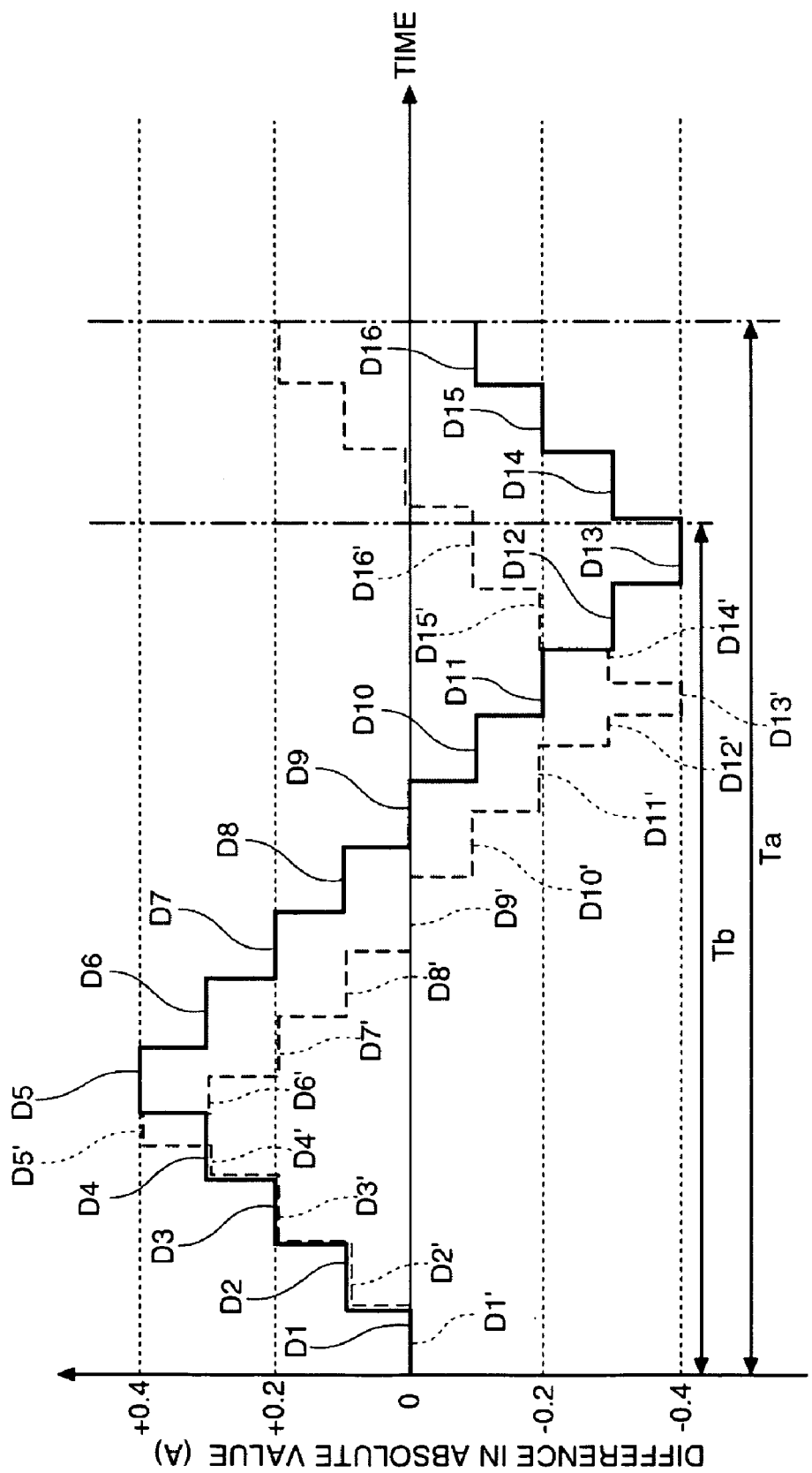
FIG. 16 is a view for explaining an exemplary control of a discharge lamp lighting device according to an embodiment of the invention.

FIG. 16 shows an exemplary cyclical pattern to change the difference in absolute value between the current value of the AC current I for discharge lamp driving in the first polarity section and the current value in the second polarity section. The horizontal axis represents time. The vertical axis represents the difference in absolute value between the current value of the AC current I for discharge lamp driving in the first polarity section and the current value in the second polarity section. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W.

In the case where the driving power of the discharge lamp 90 is 200 W, the control unit 40 carries out sectional current control processing to change the difference in absolute value between the current value of the AC current I for discharge lamp driving in the first polarity section and the current value in the second polarity section, stepwise in a first cyclical pattern of one cycle Ta including 16 sectional periods (sectional periods D1 to D16) in which the difference in absolute value between the current value of the AC current I for discharge lamp driving in the first polarity section and the current value in the second polarity section is maintained at the same value. In this embodiment, the length per sectional period is four seconds.

Similarly, in the case where the driving power of the discharge lamp 90 is 160 W, sectional current control processing is carried out to change the difference in absolute value between the current value of the AC current I for discharge lamp driving in the first polarity section and the current value in the second polarity section, stepwise in a second cyclical pattern of one cycle Tb including 16 sectional periods in which the difference in absolute value between the current value of the AC current I for discharge lamp driving in the first polarity section and the current value in the second polarity section is maintained at the same value. In this embodiment, the length per sectional period in the case where the driving power is 160 W is four seconds, which is the same as in the case where the driving power of the discharge lamp 90 is 200 W, if the difference in absolute value between the current value of the AC current I for discharge lamp driving in the first polarity section and the current value in the second polarity section is −0.2 A or greater and +0.2 A or smaller. However, if the difference in absolute value between the current value of the AC current I for discharge lamp driving in the first polarity section and the current value in the second polarity section is smaller than −0.2 A or greater than +0.2 A, the length per sectional period is two seconds, which is shorter than in the case where the driving power of the discharge lamp 90 is 200 W.

That is, the length per sectional period is four seconds in the sectional periods D1' to D3', two seconds in the sectional periods D4' to D6', four seconds in the sectional periods D7' to D11', two seconds in the sectional periods D12' to D14', and four seconds in the sectional periods D15' and D16'.

In this manner, in the control where the length per sectional period in the case of driving the discharge lamp 90 with low power is made shorter than the length per sectional period in the case of driving the discharge lamp 90 with high driving power, also in the case where control is carried out to reduce the length of the sectional period as the difference in absolute value between the current value of the AC current I for discharge lamp driving in the first polarity section and the current value in the second polarity section is increased, the low-temperature state of the electrodes of the discharge lamp 90 can be prevented from continuing for a long time when driving the discharge lamp 90 with low power. Therefore, occurrence of flicker at the time of low-power driving can be restrained.

Figure 17:
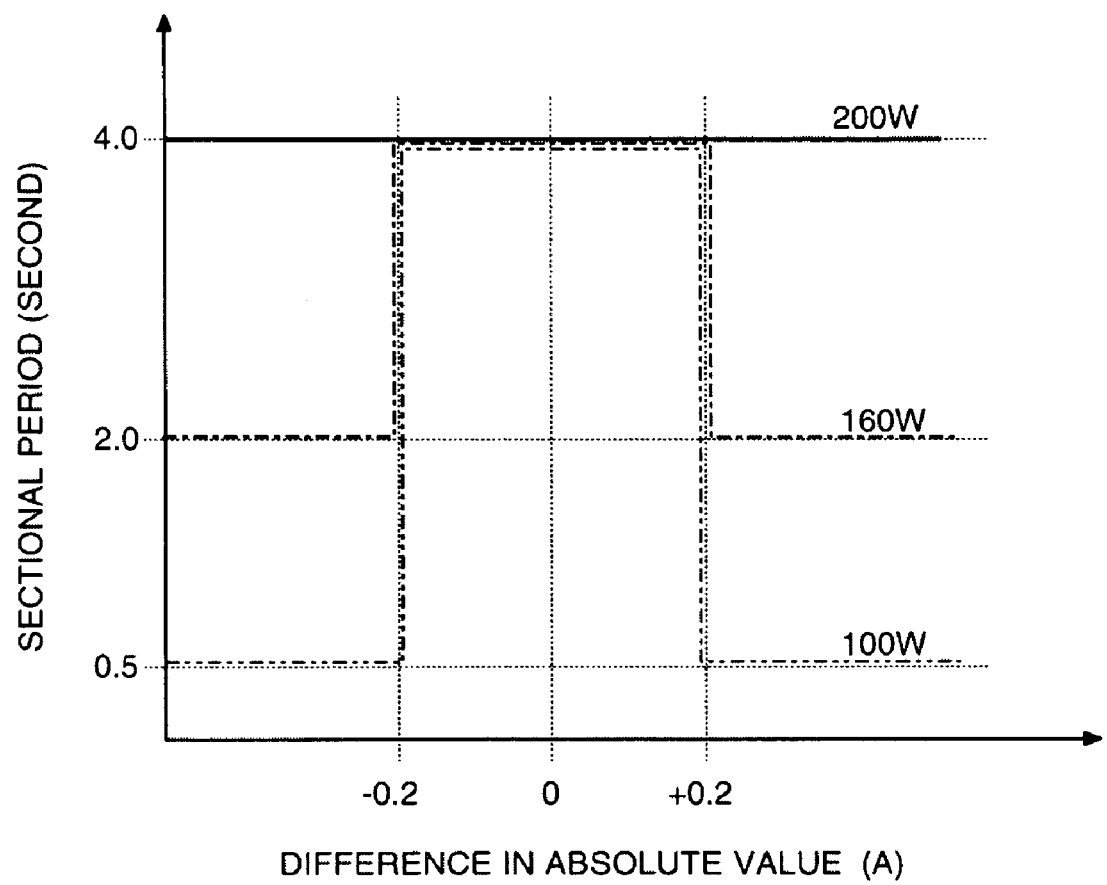
FIG. 17 is a view for explaining an exemplary control of a discharge lamp lighting device according to an embodiment of the invention.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90, the length per sectional period and the difference in absolute value between the current value of the AC current I for discharge lamp driving in the first polarity section and the current value in the second polarity section may be predetermined, for example, as shown in the graph of FIG. 17, and the correspondence data may be stored, for example, in the storage unit 44 of the control unit 40.

Second Modification

In the above embodiment, the maximum value and the minimum value of the difference in absolute value between the current value of the AC current I for discharge lamp driving in the first polarity section and the current value in the second polarity section are constant irrespective of the driving power of the discharge lamp 90. However, sectional current control processing may be carried out in which the absolute value of at least one of the maximum value and the minimum value of the difference in absolute value between the current value of the AC current I for discharge lamp driving in the first polarity section and the current value in the second polarity section is increased as the driving power of the discharge lamp 90 is reduced. As an example, the case of increasing both the maximum value and the minimum value of the difference in absolute value between the current value of the AC current I for discharge lamp driving in the first polarity section and the current value in the second polarity section as the driving power of the discharge lamp 90 is reduced will be described hereinafter.

Figure 18:
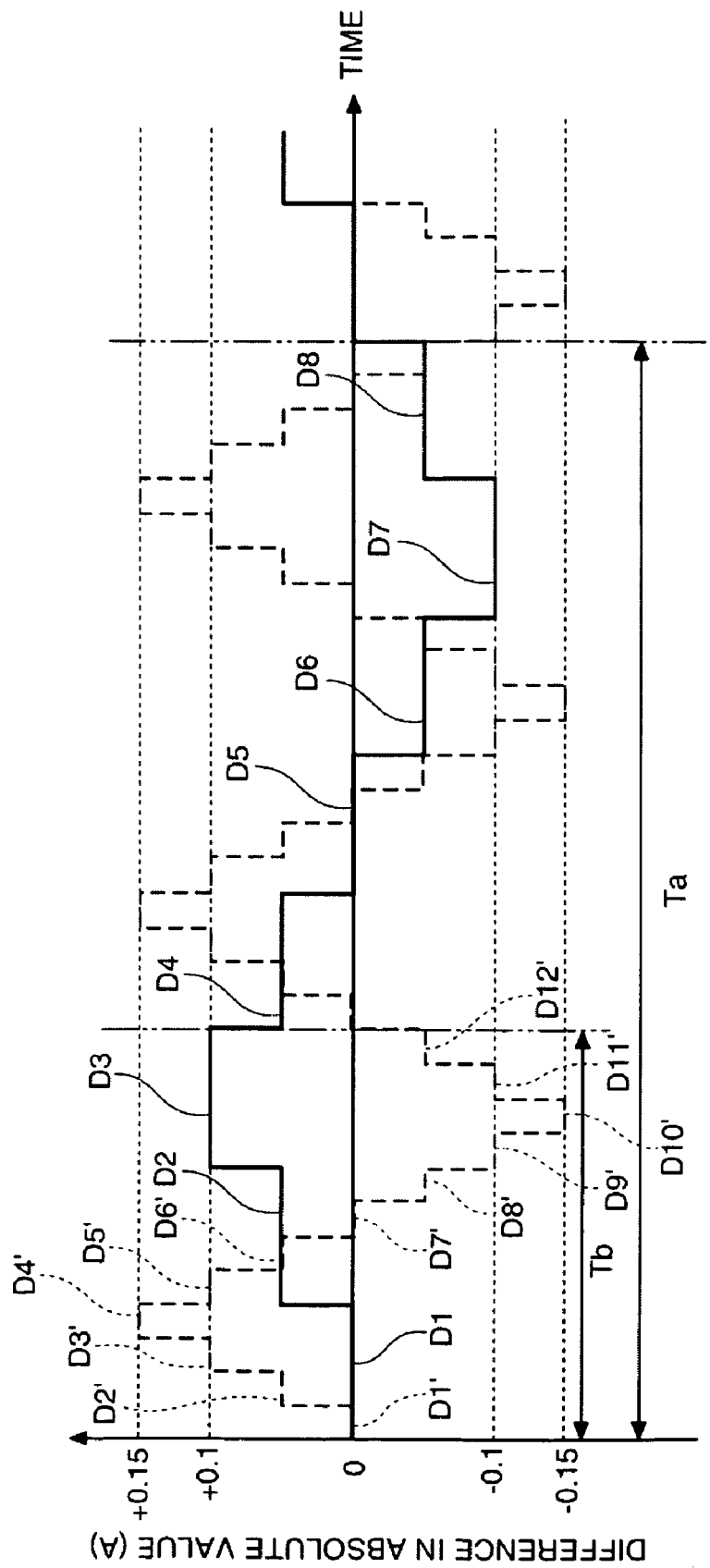
FIG. 18 is a view for explaining an exemplary control of a discharge lamp lighting device according to an embodiment of the invention.

FIG. 18 shows an exemplary cyclical pattern to change the difference in absolute value between the current value of the AC current I for discharge lamp driving in the first polarity section and the current value in the second polarity section. The horizontal axis represents time. The vertical axis represents the difference in absolute value between the current value of the AC current I for discharge lamp driving in the first polarity section and the current value in the second polarity section. The solid line represents a first cyclical pattern in the case where the DC current Id causes the driving power of the discharge lamp 90 to be 200 W. The broken line represents a second cyclical pattern in the case where the DC current Id causes the driving power of the discharge lamp 90 to be 160 W.

In the case where the driving power of the discharge lamp 90 is 200 W, the control unit 40 carries out sectional current control processing to change the difference in absolute value between the current value of the AC current I for discharge lamp driving in the first polarity section and the current value in the second polarity section stepwise in the period of one cycle Ta of the first cyclical pattern including eight sectional periods (sectional periods D1 to D8) in which the difference in absolute value between the current value of the AC current I for discharge lamp driving in the first polarity section and the current value in the second polarity section is maintained at the same value. In this embodiment, the length per sectional period is eight seconds.

Similarly, in the case where the driving power of the discharge lamp 90 is 160 W, sectional current control processing is carried out to change the difference in absolute value between the current value of the AC current I for discharge lamp driving in the first polarity section and the current value in the second polarity section stepwise in the period of one cycle Tb of the second cyclical pattern including 12 sectional periods (sectional periods D1' to D12') in which the difference in absolute value between the current value of the AC current I for discharge lamp driving in the first polarity section and the current value in the second polarity section is maintained at the same value. In this embodiment, the length per sectional period is two seconds, which is shorter than in the case where the driving power of the discharge lamp 90 is 200 W.

The control in the case where the driving power of the discharge lamp 90 is 200 W is similar to the case of FIG. 13. However, the maximum value of the difference in absolute value between the current value of the AC current I for discharge lamp driving in the first polarity section and the current value in the second polarity section is +0.1 A and the minimum value is −0.1 A.

The control in the case where the driving power of the discharge lamp 90 is 160 W will now be described. The difference in absolute value between the current value of the AC current I for discharge lamp driving in the first polarity section and the current value in the second polarity section is 0 in the sectional period D1'. After that, the difference in absolute value between the current value of the AC current I for discharge lamp driving in the first polarity section and the current value in the second polarity section is increased by 0.05 A each. The difference in absolute value between the current value of the AC current I for discharge lamp driving in the first polarity section and the current value in the second polarity section reaches the maximum level of 0.15 A in the sectional period D4'.

After that, the difference in absolute value between the current value of the AC current I for discharge lamp driving in the first polarity section and the current value in the second polarity section is decreased by 0.05 A each. The difference in absolute value between the current value of the AC current I for discharge lamp driving in the first polarity section and the current value in the second polarity section reaches the minimum level of −0.15 A in the sectional period D10'. After that, the difference in absolute value between the current value of the AC current I for discharge lamp driving in the first polarity section and the current value in the second polarity section is increased by 0.05 A each, and increase and decrease of the difference in absolute value between the current value of the AC current I for discharge lamp driving in the first polarity section and the current value in the second polarity section is repeated with the cycle Tb.

In this manner, the control to increase the absolute value of at least one of the maximum value and the minimum value of the difference in absolute value between the current value of the AC current I for discharge lamp driving in the first polarity section and the current value in the second polarity section as the driving power of the discharge lamp 90 is reduced, is combined in addition to the control where the length per sectional period in the case of driving the discharge lamp 90 with low power is made shorter than the length per sectional period in the case of driving the discharge lamp 90 with high driving power. Thus, the low-temperature state of the electrodes of the discharge lamp 90 can be prevented from continuing for a long time when driving the discharge lamp 90 with low power, and also in the case where the discharge lamp 90 is driven with lower power and the length per sectional period is reduced, the electrode temperature can be changed substantially. Therefore, occurrence of flicker at the time of low-power driving can be restrained. Moreover, formation of a stationary convection current within the discharge lamp 90 can be restrained and uneven wear of the electrodes and uneven precipitation of the electrode material can be prevented.

Figure 19:
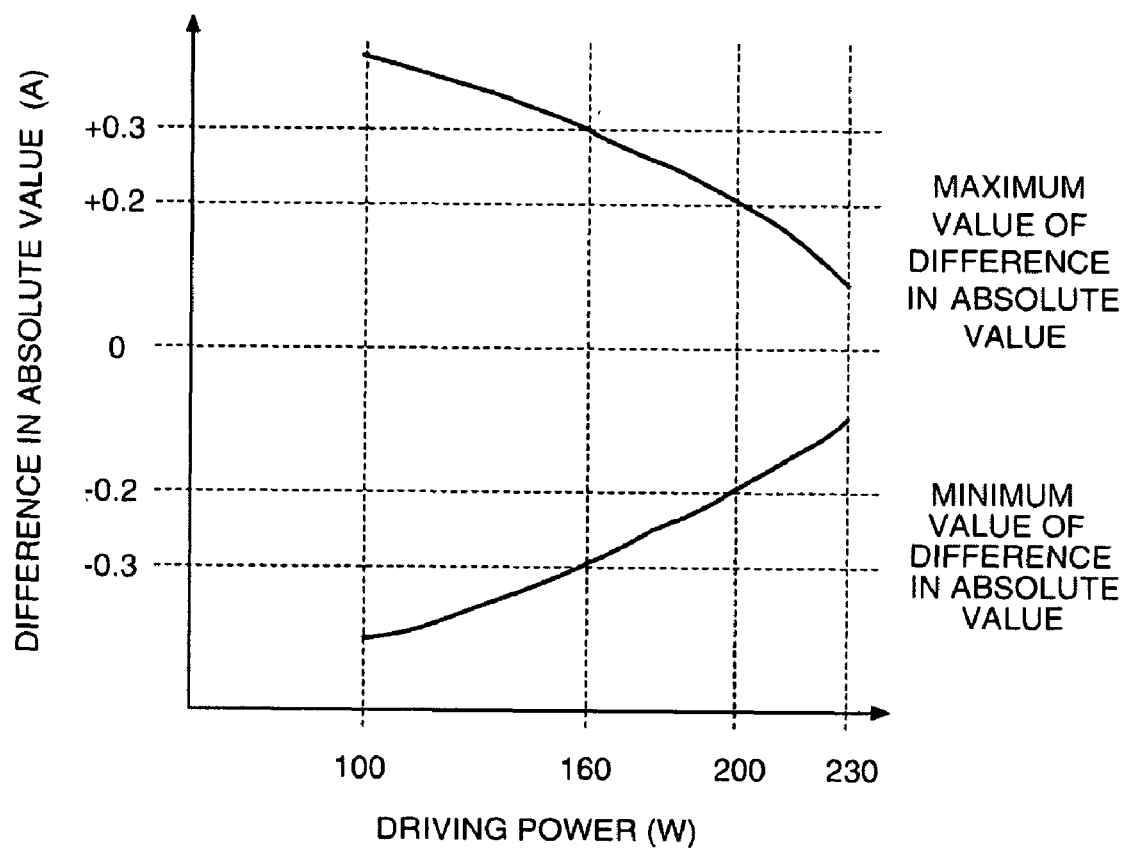
FIG. 19 is a view for explaining an exemplary control of a discharge lamp lighting device according to an embodiment of the invention.

In the description of this embodiment, the two types of driving power are used, that is, the case where the driving power of the discharge lamp 90 is 200 W and the case where the driving power of the discharge lamp 90 is 160 W. However, the driving power of the discharge lamp 90 may be changed by using continuous values or small steps in accordance with the power control signal S. In such case, the correspondence between the driving power of the discharge lamp 90 and the range of the difference in absolute value between the current value of the AC current I for discharge lamp driving in the first polarity section and the current value in the second polarity section may be predetermined, for example, as shown in the graph of FIG. 19, and the correspondence data may be stored, for example, in the storage unit 44 of the control unit 40.

Other Modifications

It is possible to combine the control to reduce the length per sectional period as the difference in absolute value between the current value of the AC current I for discharge lamp driving in the first polarity section and the current value in the second polarity section is increased, as described in the first modification, and the control to increase the absolute value of at least one of the maximum value and the minimum value of the difference in absolute value between the current value of the AC current I for discharge lamp driving in the first polarity section and the current value in the second polarity section as the driving power of the discharge lamp 90 is reduced, as described in the second modification, with the control where the length per sectional period in the case of driving the discharge lamp 90 with low power is made shorter than the length per sectional period in the case of driving the discharge lamp 90 with high driving power.

With such a combination of the controls, occurrence of flicker at the time of low-power driving can be restrained further. Moreover, formation of a stationary convection current within the discharge lamp 90 can be restrained and uneven wear of the electrodes and uneven precipitation of the electrode material can be prevented.

In the above embodiment, the frequency of the AC current I for discharge lamp driving is fixedly controlled. However, the control unit 40 may carry out AC conversion control processing to control the frequency of the AC current I for discharge lamp driving in association with the average value of the DC current Id outputted from the power control circuit 20. For example, the control unit 40 may carry out AC conversion control processing to increase the frequency of the AC current I for discharge lamp driving as the average value of the DC current Id outputted from the power control circuit 20 is reduced.

In such case, the correspondence between the driving power of the discharge lamp 90 and the frequency of the AC current I for discharge lamp driving may be predetermined, for example, as shown in the graph of FIG. 12, and the correspondence data may be stored, for example, in the storage unit 44 of the control unit 40.

In this manner, the control to increase the frequency of the AC current I for discharge lamp driving as the current value of the DC current Id outputted from the power control circuit 20 is reduced is combined in addition to the control to cause the length per sectional period in the case of driving the discharge lamp 90 with low power to be shorter than the length per sectional period in the case of driving the discharge lamp 90 with high driving power. Thus, flicker can be restrained further.

4. Circuit Configuration of Projector

Figure 20:
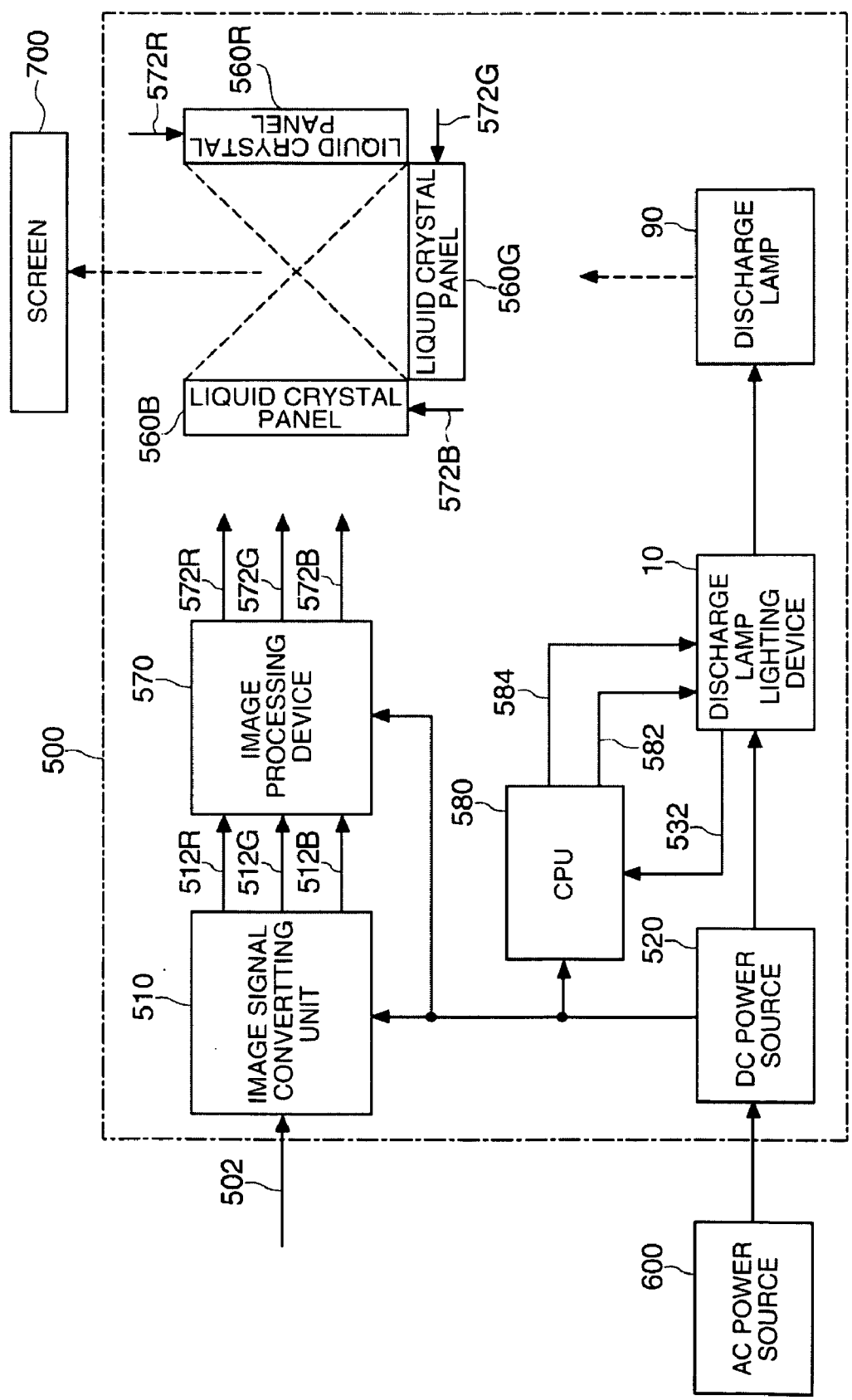
FIG. 20 is a view for explaining an exemplary configuration of a projector according to an embodiment of the invention.

FIG. 20 shows an exemplary circuit configuration of a projector according to this embodiment. A projector 500 includes an image signal converting unit 510, a DC power source 520, the discharge lamp lighting device 10, the discharge lamp 90, liquid crystal panels 560R, 560G and 560B, and an image processing device 570, in addition to the previously described optical system.

The image signal converting unit 510 converts an image signal 502 inputted from outside (luminance-color difference signal, analog RGB signal or the like) to a digital RGB signal with a predetermined word length, thus generates image signals 512R, 512G and 512B, and supplies these image signals to the image processing device 570.

The image processing device 570 carries out image processing to each of the three image signals 512R, 512G and 512B and outputs driving signals 572R, 572G and 572B to drive the liquid crystal panels 560R, 560G and 560B, respectively.

The DC power source 520 converts an AC voltage supplied from an external AC power source 600 to a constant DC voltage, and supplies the DC voltage to the image signal converting unit 510 and the image processing device 570, which are situated on the secondary side of a transformer (not shown, but included in the DC power source 520), and to the discharge lamp lighting device 530, which is situated on the primary side of the transformer.

The discharge lamp lighting device 10 generates a high voltage between the electrodes of the discharge lamp 90 at the time of startup, thus causes dielectric breakdown and forms a discharge path. After that, the discharge lamp lighting device 10 supplies a driving current to maintain discharge of the discharge lamp 90.

The liquid crystal panels 560R, 560G and 560B modulate the luminance of color light beams that become incident on the respective liquid crystal panels in accordance with the driving signals 572R, 572G and 572B corresponding to their respective image signals.

A CPU 580 controls operations from the lighting start to the light-out of the projector. When the power of the projector is turned on and the output voltage of the DC power source 520 reaches a predetermined value, the CPU 580 generates and supplies a lighting signal 582 to the discharge lamp lighting device 10. In addition, the CPU 580 may supply the power control signal 584 to the discharge lamp lighting device 10. The CPU 580 may receive lighting information 532 of the discharge lamp 90 from the discharge lamp lighting device 10.

In the projector 500 having such a configuration, formation of a stationary convection current in the discharge lamp can be restrained and thus uneven wear of the electrodes and uneven precipitation of the electrode material can be prevented. Moreover, flicker at the time of low-power driving can be restrained. Therefore, a projector that can maintain projection luminance for a long period can be realized.

In the above embodiments, the projector having three liquid crystal panels is used as an example. However, the invention is not limited to this and can be applied to a projector having one, two, or four or more liquid crystal panels.

In the above embodiments, the transmission-type projector is used as an example. However, the invention is not limited to this and can be applied to a reflection-type projector. Here, the "transmission-type" refers to a type in which an electro-optical modulation device as a light modulating unit transmits light like a transmission-type liquid crystal panel. The "reflection-type" refers to a type in which an electro-optical modulation device as a light modulating unit reflects light like a reflection-type liquid crystal panel or micromirror-type light modulation device. As a micromirror-type light modulation device, for example, DMD (Digital Micromirror Device, trademark of Texas Instruments) can be used. Also in the case where the invention is applied to a reflection-type projector, the similar effects as a transmission-type projector can be achieved.

The invention can also be applied to a front projection-type projector that projects a projection image from the observing side, and to a rear projection-type projector that projects a projection image from the opposite side of the observing side.

The invention is not limited to the above embodiments and various modifications can be made without departing from the scope of the invention.

The invention includes substantially the same configuration as the configuration described in the embodiments (for example, a configuration that realize the same function, method and result, or a configuration that realizes the same purpose and effect). The invention also includes the configuration described in the embodiments but in which unessential parts are replaced. The invention also includes a configuration that realizes the same functional effect or the same purpose as the configuration described in the embodiment. The invention also includes the configuration described in the embodiments with a traditional technique added thereto.

For example, the control unit 40 may carry out sectional current control processing in which the current value of the DC current Id reaches the maximum in a section in the latter half of each of the first polarity section and the second polarity section.

The control unit 40 may also carry out sectional current control processing in which the current value of the DC current Id is monotonically increased in each of the first polarity section and the second polarity section. The control unit 40 may also carry out sectional current control processing in which the current value of the DC current Id is appropriately varied in each of the first polarity section and the second polarity section.

In the foregoing, the absolute value of the magnitude of the current has been described by reference to a current having a constant value during each of the first and second polarity sections—that is, the current has a rectangular waveform. However, in the event that the waveform is not rectangular, the absolute value can be calculated based on the average, median, maximum, minimum or other value derivable from the current waveform in the first and second polarity sections.

The entire disclosure of Japanese Patent Application No. 2008-074216, filed Mar. 21, 2008 is expressly incorporated by reference herein.

What is claimed is:
1. A discharge lamp lighting device comprising:
a power control circuit that outputs a DC current;
an AC converter circuit that takes the DC current as its input, inverts a polarity of the DC current in predeter- mined timing, and thereby generates and outputs an AC current for discharge lamp driving; and a control unit configured to control the AC converter circuit to perform an AC conversion control for controlling the timings at which a polarity of the AC current for discharge lamp driving is inverted and configured to control the power control circuit to perform a current control for controlling a current value of the DC current wherein the control unit changes, in a cyclical pattern, an cumulative energy supplied to each electrode of a discharge lamp during one cycle of the AC current for discharge lamp driving;

the cyclical pattern includes plural sectional periods in which the cumulative energy is maintained at a same value over plural cycles of the AC current for discharge lamp driving, and a level of the cumulative energy differs between at least two of the sectional periods; and the control unit performs the current control by receiving a power control signal from outside, and setting an average value of the DC current in a section corresponding to the one cycle of the AC current for discharge lamp driving to a current value corresponding to the power control signal, and controlling a length of the sectional period included in the cyclical pattern in relation to the average value of the DC current.

2. The discharge lamp lighting device according to claim 1, wherein the control unit performs the AC conversion control such that a frequency of the AC current for discharge lamp driving is controlled in relation to the average value of the DC current.

3. The discharge lamp lighting device according to claim 1, wherein the control unit performs the AC conversion control such that a frequency of the AC current for discharge lamp driving is increased as the average value of the DC current is reduced.

4. A projector comprising the discharge lamp lighting device according to claim 1.

5. A discharge lamp lighting device comprising:
a power control circuit that outputs a DC current;
an AC converter circuit that takes the DC current as its input, repeats inverting a polarity of the DC current between first polarity and second polarity in predetermined timing, and thereby generates and outputs an AC current for discharge lamp driving; and
a control unit configured to control the AC converter circuit to perform an AC conversion control for controlling a duty ratio of the AC current for discharge lamp driving, the duty ratio being a proportion of time of the first polarity in one cycle of the AC current in accordance with polarity inversion timing of the AC current for discharge lamp driving, and the control unit configured to control the power control circuit to perform a current control for controlling a current value of the DC current;
wherein the control unit performs the AC current control such that the duty ratio of the AC current for discharge lamp driving is changed in accordance with a cyclical pattern, the cyclical pattern includes plural sectional periods in which the duty ratio is maintained at a same value over plural cycles of the AC current for discharge lamp driving, and the duty ratio differs between at least two of the sectional periods; and
the control unit performs the current control by receiving a power control signal from outside, and setting an average value of the DC current in a section corresponding to the one cycle of the AC current for discharge lamp driving to a current value corresponding to the power control signal, and performs the AC conversion control such that a length of the sectional period included in the cyclical pattern is controlled in relation to the average value of the DC current.

6. The discharge lamp lighting device according to claim 5, wherein the control unit performs the AC conversion control such that a length of the sectional period is reduced as the average value of the DC current is reduced.

7. The discharge lamp lighting device according to claim 5, wherein the control unit performs the AC conversion control such that a length of the sectional period is controlled in relation to a difference between the duty ratio and a predetermined reference duty ratio.

8. The discharge lamp lighting device according to claim 5, wherein the control unit performs the AC conversion control such that a length of the sectional period is reduced as a difference between the duty ratio and a predetermined reference duty ratio is increased.

9. A projector comprising the discharge lamp lighting device according to claim 5.

10. The discharge lamp lighting device according to claim 5, wherein the control unit performs the AC conversion control such that a frequency of the AC current for discharge lamp driving is controlled in relation to the average value of the DC current.

11. The discharge lamp lighting device according to claim 5, wherein the control unit performs the AC conversion control such that a frequency of the AC current for discharge lamp driving is increased as the average value of the DC current is reduced.

12. A discharge lamp lighting device comprising:
a power control circuit that outputs a DC current;
an AC converter circuit that takes the DC current as its input, repeats inverting a polarity of the DC current between first polarity and second polarity in predetermined timing, and thereby generates and outputs an AC current for discharge lamp driving; and
a control unit configured to control the AC converter circuit to perform an AC conversion control for controlling the timings at which a polarity of the AC current for discharge lamp driving is inverted and configured to control the power control circuit to perform a sectional current control for controlling a current value of the DC current;
wherein the control unit performs the sectional current control such that a difference in absolute value between a current value in a section where the AC current for discharge lamp driving has the first polarity and a current value in a section where the AC current for discharge lamp driving has the second polarity is changed in accordance with a cyclical pattern;
the cyclical pattern includes plural sectional periods in which the difference in absolute value is maintained at a same value over plural cycles of the AC current for discharge lamp driving, and a difference in the absolute value differs between at least two of the sectional periods; and
the control unit performs the section current control by receiving a power control signal from outside and setting an average value of the DC current in a section corresponding to one cycle of the AC current for discharge lamp driving to a current value corresponding to the power control signal, and controlling a length of the sectional period included in the cyclical pattern in relation to the average value of the DC current.

13. The discharge lamp lighting device according to claim 12, wherein the control unit performs the sectional current control such that the length of the sectional period is reduced as the average value of the DC current is reduced.

14. The discharge lamp lighting device according to claim 12,
wherein the control unit performs the sectional current control such that the length of the sectional period is controlled in relation to the difference in absolute value.

15. The discharge lamp lighting device according to claim 12,
wherein the control unit performs the sectional current control such that the length of the sectional period is reduced as the difference in absolute value is increased.

16. A projector comprising the discharge lamp lighting device according to claim 12.

17. The discharge lamp lighting device according to claim 12,
wherein the control unit performs the AC conversion control such that a frequency of the AC current for discharge lamp driving is controlled in relation to the average value of the DC current.

18. The discharge lamp lighting device according to claim 12,
wherein the control unit performs the AC conversion control such that a frequency of the AC current for discharge lamp driving is increased as the average value of the DC current is reduced.

19. A control method for a discharge lamp lighting device including:
a power control circuit that outputs a DC current; and
an AC converter circuit that takes the DC current as its input, inverts a polarity of the DC current in predetermined timing and thereby generates and outputs an AC current for discharge lamp driving,
the method comprising steps of:
controlling the AC conversion circuit to perform an AC conversion control for controlling the timings at which a polarity of the AC current for discharge lamp driving is inverted;
controlling the power control circuit to perform a current control for controlling a current value of the DC current; and
changing, in a cyclical pattern, a cumulative energy supplied to each electrode of a discharge lamp during one cycle of the AC current for discharge lamp driving;
wherein the cyclical pattern includes plural sectional periods in which the cumulative energy is maintained at a same value over plural cycles of the AC current for discharge lamp driving, and a level of the cumulative energy differs between at least two of the sectional periods; and wherein
the changing in the cyclical pattern includes performing the current control by receiving a power control signal from outside and setting an average value of the DC current in a section corresponding to one cycle of the AC current for discharge lamp driving to a current value corresponding to the power control signal, and controlling a length of the sectional period included in the cyclical pattern in relation to the average value of the DC current.

* * * * *